(12) United States Patent
Romain et al.

(10) Patent No.: US 10,643,217 B2
(45) Date of Patent: May 5, 2020

(54) DEBIT-BASED IDENTITY THEFT MONITORING AND PREVENTION

(75) Inventors: Martin R. Romain, Oakdale, MN (US); Paul P. Bjerke, Woodbury, MN (US)

(73) Assignee: EFUNDS CORPORATION, Jacksonville, FL (US)

( * ) Notice: Subject to any disclaimer, the term of this patent is extended or adjusted under 35 U.S.C. 154(b) by 2085 days.

(21) Appl. No.: 11/138,808

(22) Filed: May 26, 2005

(65) Prior Publication Data
US 2006/0271456 A1    Nov. 30, 2006

(51) Int. Cl.
| | | |
|---|---|---|
| *G06Q 20/42* | (2012.01) | |
| *G06Q 20/36* | (2012.01) | |
| *G06Q 30/06* | (2012.01) | |
| *G06Q 40/00* | (2012.01) | |

(52) U.S. Cl.
CPC ......... *G06Q 20/42* (2013.01); *G06Q 20/3674* (2013.01); *G06Q 20/425* (2013.01); *G06Q 30/06* (2013.01); *G06Q 40/00* (2013.01)

(58) Field of Classification Search
None
See application file for complete search history.

(56) References Cited

U.S. PATENT DOCUMENTS

| | | | |
|---|---|---|---|
| 6,370,139 B2 * | 4/2002 | Redmond | 370/354 |
| 6,488,206 B1 * | 12/2002 | Flaig et al. | 235/380 |
| 6,714,918 B2 * | 3/2004 | Hillmer et al. | 705/18 |
| 2002/0087460 A1 | 7/2002 | Hornung | |
| 2002/0169747 A1 * | 11/2002 | Chapman et al. | 707/1 |
| 2003/0009426 A1 | 1/2003 | Ruiz-Sanchez | |
| 2003/0115459 A1 | 6/2003 | Monk | |
| 2004/0083140 A1 | 4/2004 | Browning et al. | |
| 2004/0098607 A1 | 5/2004 | Alagna et al. | |
| 2004/0128240 A1 * | 7/2004 | Yusin | 705/39 |
| 2004/0139050 A1 | 7/2004 | Barrett et al. | |
| 2004/0153663 A1 | 8/2004 | Clark et al. | |
| 2004/0177046 A1 | 9/2004 | Ogram | |
| 2004/0230448 A1 * | 11/2004 | Schaich | 705/1 |
| 2005/0038791 A1 * | 2/2005 | Ven | 707/100 |

* cited by examiner

*Primary Examiner* — Zeshan Qayyum
*Assistant Examiner* — Yingying Zhou
(74) *Attorney, Agent, or Firm* — Finnegan, Henderson, Farabow, Garrett & Dunner LLP

(57) ABSTRACT

Systems and methods of monitoring financial information of a consumer for fraudulent activity. One method can include receiving an account closure event from an event provider, determining if the account closure event is associated with financial information of the consumer, generating a notification, and providing the notification to the consumer. Another method can include receiving a returned check event from an event provider, determining if the returned check event is associated with financial information of the consumer, generating a notification, and providing the notification to the consumer.

52 Claims, 17 Drawing Sheets

DEBIT-BASED IDENTITY THEFT MONITORING AND PREVENTION

BACKGROUND OF THE INVENTION

Many financial institutions ("FIs") and consumers have suffered financial loss, hours of investigation time, and/or loss of reputation due to credit and debit account takeover events where a person posing as a true account owner gains access to financial information. Many FIs and consumers have also lost money, time, and status due to credit and debit accounts that are approved under false pretenses where a person uses another person's name, social security number, driver's license number, etc., in order to establish an account.

SUMMARY OF THE INVENTION

In light of the above situations, embodiments of the invention seek to provide a method and system for sharing information between consumers, financial institutions, merchants, and payment device providers in order to help prevent or limit potential financial or reputation loss due to the actions of identity thieves. Embodiments of the invention also seek to provide an identity theft solution that combats identity theft and addresses aspects of an identity theft lifecycle.

Some embodiments of the invention provide a method of monitoring financial information of a consumer for fraudulent activity. The method can include receiving an account closure event from an event provider, determining if the account closure event is associated with financial information of the consumer, generating a notification, and providing the notification to the consumer.

Embodiments of the invention also provide a method including receiving a returned check event from an event provider, determining if the returned check event is associated with financial information of the consumer, generating a notification, and providing the notification to the consumer.

Additional embodiments of the invention provide a monitoring system for monitoring financial information of a consumer for fraudulent activity. The monitoring system can be configured to receive an account closure event from an event provider, to determine if the account closure event is associated with financial information of the consumer, to generate a notification, and to provide the notification to the consumer.

Another embodiment of the invention can provide a monitoring system configured to receive a returned event from an event provider, to determine if the returned event is associated with financial information of the consumer, to generate a notification, and to provide the notification to the consumer.

Some embodiments of the invention also provide a method including providing first information to an identity authentication system, using the first information to authenticate the consumer, providing the first information to a monitoring system, and storing the first information in a consumer's database. The method can also include receiving a plurality of events from an event provider, determining if any of the plurality of events are associated with the consumer, generating a notification, and providing the notification to the consumer.

DETAILED DESCRIPTION

Figure 1:
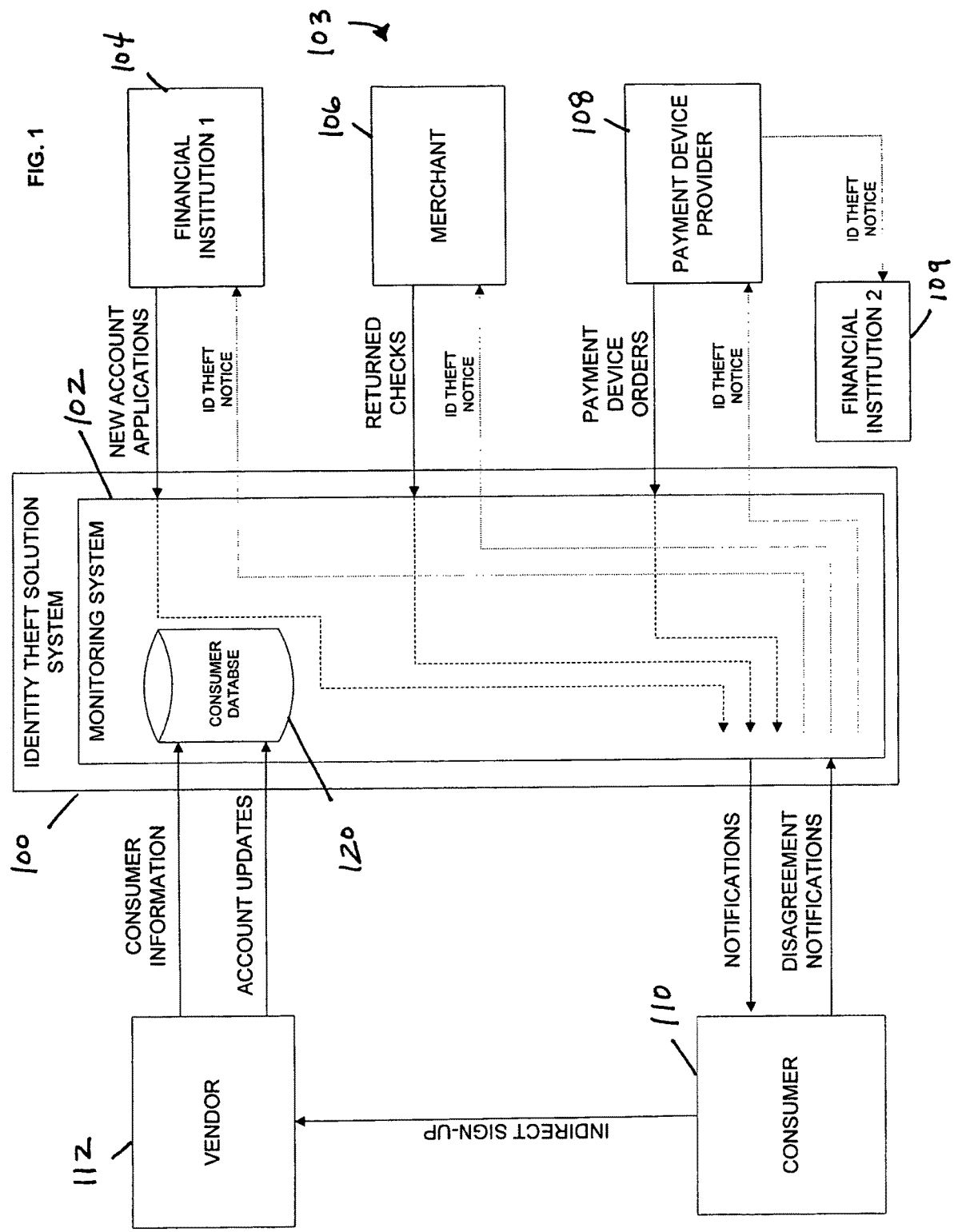
FIG. 1 illustrates an identity theft solution system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention include both hardware and software components or modules. As such, it should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

Many relationships exist between financial institutions, retail merchants, and payment device providers (e.g., check printers). A purpose of these relationships can be to help make better decisions by sharing information regarding consumer behavior under guidelines of the Fair Credit Report Act ("FCRA"). Some embodiments of the invention expand relationships sharing information to include consumers. Using the shared information, consumers can be notified of new or updated financial information. The notifications can serve as validations in order to ensure the consumer's private information is being appropriately used or reviewed. For example, an individual or organization ("consumer 1") has a checking account at a first financial institution ("FI A") and signs up for account monitoring. Consumer 1 supplies consumer information, such as name, address, social security number or taxpayer identification number, driver's license number or other government identification number, and/or account number. If a second financial institution ("FI B") receives an application from an individual or organization claiming to be consumer 1, consumer 1 can be notified within a predetermined time period, for example, approximately one to three days, at the address provided by consumer 1, of the new account application inquiry. In some embodiments, if consumer 1 did apply for the account, consumer 1 does not take any action. If consumer 1, however, did not apply for the account (a possible identify thief did), consumer 1 can notify the account monitoring system of the discrepancy. The account monitoring system can then notify FI B of the potential issue. In some embodiments, the same general process can be use for merchants providing returned checks and/or payment device providers submitting payment device order (e.g., check orders).

FIG. 1 illustrates an identity theft solution system 100 according to one embodiment of the invention. The identity theft solution system 100 can include one or more components provided by one or more service providers that establish an identity theft solution. In some embodiments, the identity theft solution system 100 includes a monitoring system 102. The monitoring system 102 can monitor credit events and/or debit events [such as non-voluntary and voluntary account closure events, new account inquiry events, payment device order events (e.g., check orders), returned check events, account freeze information events (e.g., when an account freeze or an account alert is placed and when an account freeze or an account alert is lifted), and/or stolen or lost account information events] which can be issued when accounts numbers, credit and/or debit cards, or other account information that could potentially be used by an identity thief is lost or stolen.

As shown in FIG. 1, events can be transmitted from one or more event providers 103, such as one or more financial institutions 104. A financial institution 104 can include an investment bank, a commercial bank, a trust company, a credit union, an investment company, a thrift, a federal or state savings bank, a savings and loan associate, a brokerage house, an insurance company, etc., or another financial service provider. In some embodiments, a financial institution 104 transmits new account inquiry events. A financial institution 104 can also transmit account closure events, account freeze information events, and/or lost or stolen account information events.

Event providers 103 can also include one or more merchants 106. A merchant 106 can include an individual or an organization that provides goods or services and receives payment in return. In some embodiments, a merchant 106 transmits returned check events. A returned check event can be associated with a twice returned check. A merchant 6 can also transmit new account inquiry events and account closure events for merchant-based accounts, such as credit accounts that can be used only at specific merchants.

In some embodiments, event providers 103 include one or more payment device providers 108. A payment device provider 108 can provide payment devices, such as checks, credit cards, debit cards, automatic teller machine ("ATM") cards, etc., that can be used as a form of payment for goods or services. Payment devices can be associated with one or more accounts of a consumer, and money can be transferred from an account of the consumer when the consumer uses the payment device. In some embodiments, a payment device provider 108 transmits payment device order events, such as check orders, credit card orders, debit card orders, and/or ATM card orders. A payment device provider 108 can also transmit lost or stolen account information events regarding payment devices that are reported lost or stolen.

As shown in FIG. 1, in some embodiments, a payment device provider 108 receives events, such as payment device order events, from a financial institution 109, such as a bank, that is placing a payment device order on behalf of a consumer. The payment device provider 108 can forward the events from the financial institution 109 to the identity theft solution system 100. In some embodiments, the financial institution 109 can directly provide payment device order events, or other types of events, to the monitoring system 102 directly.

Additional types of event providers 103 can also be included in the identity theft solution system 100.

The monitoring system 102 receives events from one or more event providers 103 and can generate one or more notifications for a consumer 110. A notification can include events associated with the consumer 110. Upon receiving a notification, the consumer 110 can transmit one or more disagreement notifications if the consumer 110 disagrees with the notification. For example, if the consumer 110 receives a notification that includes a new account inquiry event, and the consumer 110 has not applied for a new account, the consumer 110 can transmit a disagreement notification. In some embodiments, a notification indicates how the consumer 110 can generate and transmit a disagreement notification.

Figure 3:
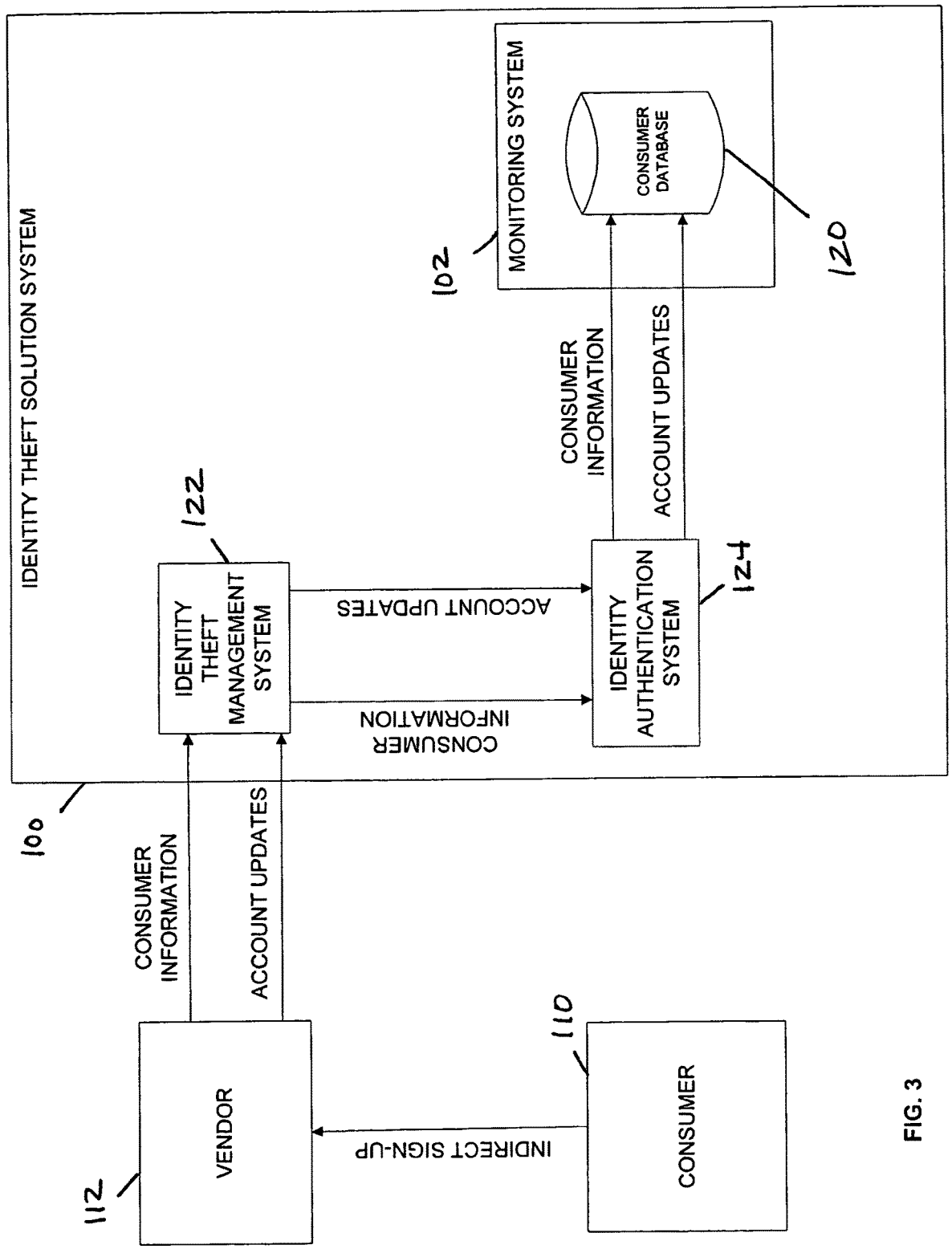
FIG. 3 illustrates a method of enrolling in the identity theft solution system of FIG. 1.

In some embodiments, the consumer 110 routes disagreement notifications to a vendor 112 associated with the consumer 110, and the vendor 112 forwards the disagreement notifications to a system, such as, to the monitoring system 102, another component of the identity theft solution system 100. For example, the consumer 110 can route disagreement notifications to the identity theft management system 122 (as shown in FIG. 3), and the identity theft management system 122 can route disagreement notifications to the monitoring system 102 and/or to one or more event providers 103. In some embodiments, the monitoring system 102 or another component of the identity theft solution system 100 initiates one or more investigation processes, such as communicating suspected identity theft with law enforcement and/or placing an account freeze on the consumer's account information.

Disagreement notifications transmitted from the consumer 110, or a version thereof, can be routed to one of the event providers 103 as an identity ("ID") theft notice. An identity theft notice can notify one of the event providers 103 of the consumer's disagreement with one or more events screened with the monitoring system 102. In some embodiments, an identity theft notice can be provided to one or more event providers 103 depending on the event or events that the consumer 110 disagrees with. For example, if the consumer 110 disagrees with a new check order transmitted from the payment device provider 108, the monitoring system 102 can provide an identity theft notice to the payment device provider 108. In some embodiments, the monitoring system 102 can transmit identity theft notices to more than one event provider 103. For example, the monitoring system 102 can transmit identity theft notices to each event providers included in the identity theft solution system 100.

In some embodiments, the monitoring system 102 can route an identity theft notice to another system included in or external to the identity theft solution system 100 regardless of whether the system provides events. The monitoring system 102 can also log or store disagreement notifications and can provide disagreement notifications upon request from another system or through customer relations with one or more systems.

In some embodiments, the consumer 110 generates and transmits an agreement notification if the consumer 110 agrees with one or more events included in a notification. The monitoring system 102 can record the agreement notifications. The monitoring system 102 can also route the agreement notifications, or a version thereof, to one or more event providers 103 and/or other systems.

In some embodiments, if a system receives an identity theft notice, the system can initiate one or more verification processes. A verification process can include obtaining additional information regarding a particular event, stalling an event, declining an event, placing an account alert or an account freeze on an account or financial information, etc. For example, if the payment device provider 108 receives an identity theft notice based on a disagreement notification associated with a payment device order event, the payment device provider 108 can deny the payment device order. In some embodiments, the payment device provider 108 can also initiate an investigative process in order to discover the origination of the payment device order. The payment device provider 108 can also initiate an additional verification process with the financial institution 109 that requested the payment device order on behalf of a consumer, and the financial institution 109 can initiate one or more investigative processes in order to discover the origination of the payment device order. In some embodiments, a system receiving an identity theft notice can initiate an investigative process with an identity theft investigative system, such as the identity theft management system 122.

In some embodiments, a system receiving an identity theft notice can use an identity theft notice as an account alert or an account freeze request. An account freeze request can freeze all credit-based and/or debit-based information associated with a consumer. With an account freeze in place no transactions can take place associated with the consumer's financial information. A consumer can place a freeze on their financial information if the consumer suspects potential identity theft. A consumer can also place an account alert on their financial information if the consumer suspects potential identity theft. An account alert can provide similar notification of potential identity theft as an account freeze without prohibiting transactions from taking place. The consumer 110 can lift a freeze or an alert once he or she feels that their credit-based and/or debit-based information is secure.

As shown in FIG. 1, the consumer 110 can enroll with the identity theft solution system 100 through a vendor 112. The vendor 112 can include a financial institution. The consumer 110 can provide consumer information to the vendor 112, and the vendor 112 can forward the consumer information to the identity theft solution system 100. In some embodiments, the vendor 112 can provide a consumer interface, such as a website, where the consumer 110 can provide consumer information. In other embodiments, the vendor 112 can manually obtain consumer information via mail, telephone, and/or facsimile. In some embodiments, the vendor 112 already possesses consumer information for the consumer 110 (e.g., the vendor includes a financial institution that manages financial information of the consumer 110), and can forward consumer information, such as contact information, account information, etc., to the identity theft solution system 100 after receiving an indication from the consumer 110 that they wish to enroll in the identity theft solution system 100. The vendor 112 can also provide updated consumer information to the identity theft solution system 100. In some embodiments, the vendor 112 can automatically transmit updated consumer information as information is updated internally by the vendor 112.

In some embodiments, the vendor 112 can transmit consumer information to the identity theft solution system 100 over a network, such as the Internet or a local area network ("LAN"). The vendor 112 can also mail, telephone, and/or facsimile the information to the identity theft solution 100. In some embodiments, the vendor 112 encrypts the consumer information before transmitting the consumer information to the identity theft solution system 100, and the identity theft solution system 100 can decrypt the consumer information.

The identity theft solution system 100 can receive the consumer information and can store the information in a consumer database 120. Updated information transmitted from the vendor 112 can also be stored in the consumer database 120.

Figure 2:
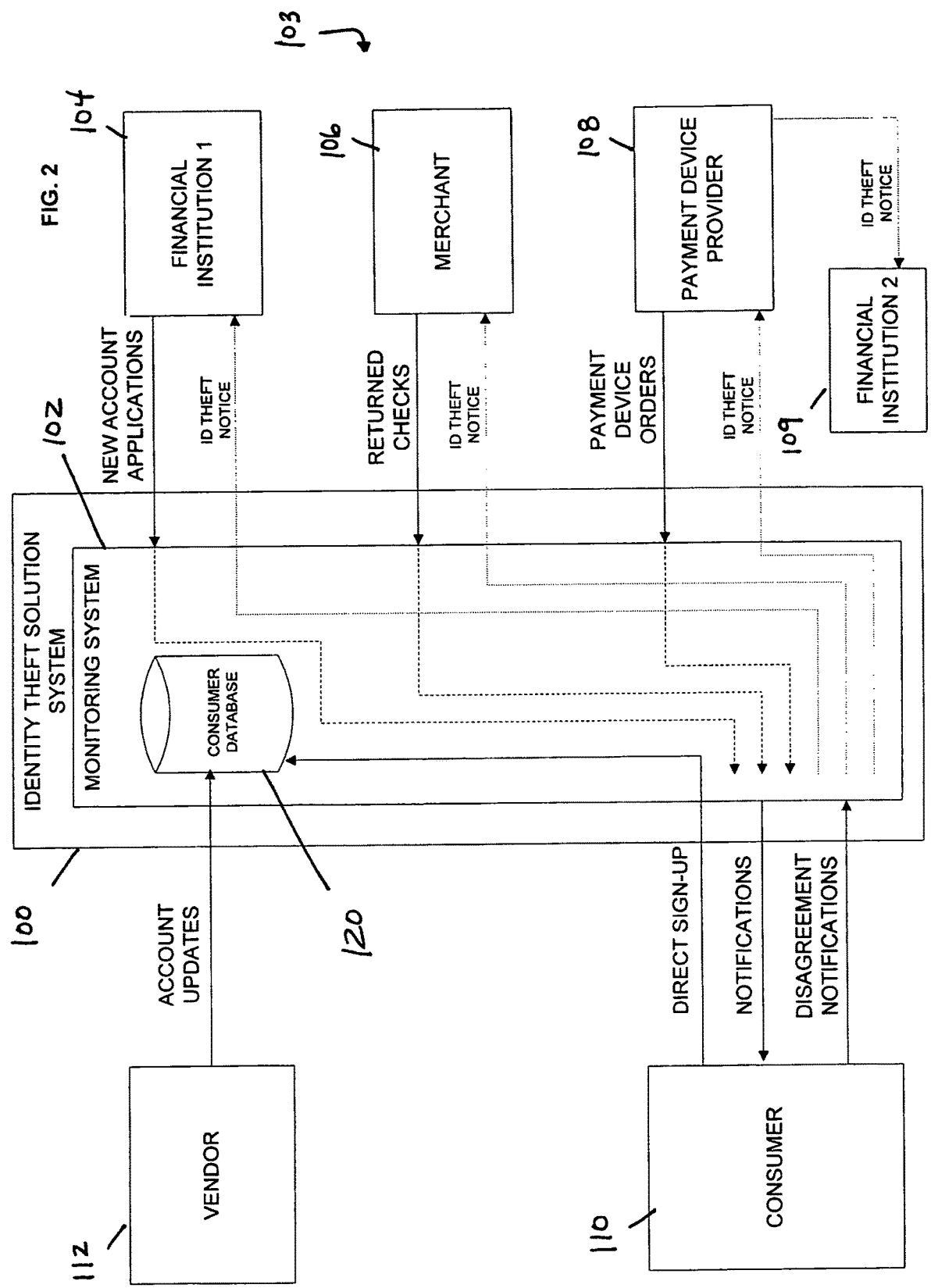
FIG. 2 illustrates another identity theft solution system according to one embodiment of the invention.

As shown in FIG. 2, the consumer 110 can directly enroll in the identity theft solution system 100 rather than indirectly through the vendor 112, and can provide consumer information and/or updated consumer information directly to the identity theft solution system 100. In some embodiments, the identity theft solution system 100 provides a consumer interface, such as a website, where the consumer 110 can enter consumer information and the consumer information can be transmitted to the identity theft solution system 100 over a network, such as the Internet. The identity theft solution system 100 can also manually obtain the consumer information, such as receive enrollment information via mail, telephone, and/or facsimile. In some embodiments, consumer information can be encrypted before being sent over a network. Consumer information provided directly to the identity theft solution system 100 from the consumer 110 can be stored in the consumer database 120.

In some embodiments, the consumer 110 can provide consumer information to the identity theft solution system 100 directly, indirectly, or a combination thereof. For example, the consumer 110 can provide enrollment information, such as contact information, directly to the identity theft solution system 100 and the vendor 112 can provide consumer information and/or updated consumer information, such as account numbers, to the identity theft solution system 100 indirectly on behalf of the consumer 110. In some embodiments, consumer information regarding the consumer 110 can be transmitted to the identity theft solution system 100 from multiple vendors 112.

As shown in FIGS. 1 and 2, once the consumer 110 is enrolled with the identity theft solution system 100, the monitoring system 102 can begin screening events provided by one or more event providers 103 for events associated with the consumer 110. In some embodiments, event providers 103 can transmit events to the identity theft solution system 100 over a network, such as the Internet or a LAN.

Event providers 103 can also transmit events to the identity theft solution system 100 via mail, telephone, facsimile, etc. In some embodiments, event providers 103 can encrypt events before transmitting the events to the monitoring system 102.

If the monitoring system 102 screens an event associated with the consumer 110, the monitoring system 102 can generate an alert or notification. The notification can be provided to the consumer 110 via mail, facsimile, telephone, and/or email. In some embodiments, as described below with respect to FIGS. 3 and 4, the consumer 110 can specify a mode of delivery of the notification.

A notification can be provided to the consumer 110, and the consumer 110 can determine whether he or she agrees with the notification. For example, if the notification includes a new account inquiry event and the consumer 110 has not attempted to open a new account, the consumer 110 can disagree with the new account inquiry event. If the consumer 110 disagrees with the notification, the consumer 110 can generate a disagreement notification and can provide the disagreement notification to the identity theft solution system 100. The identity theft solution system 100 can notify one or more systems, such as one or more event providers 103 (e.g., the event provider 103 that provided the event that the consumer 110 disagrees with) of the consumer's disagreement. The identity theft solution system 100 can also notify other financial service system, such as an identity theft investigative system, of the consumer's disagreement. The identity theft investigative system can contact the consumer and consult the consumer on how to proceed with identity theft investigation and recovery.

Figure 4:
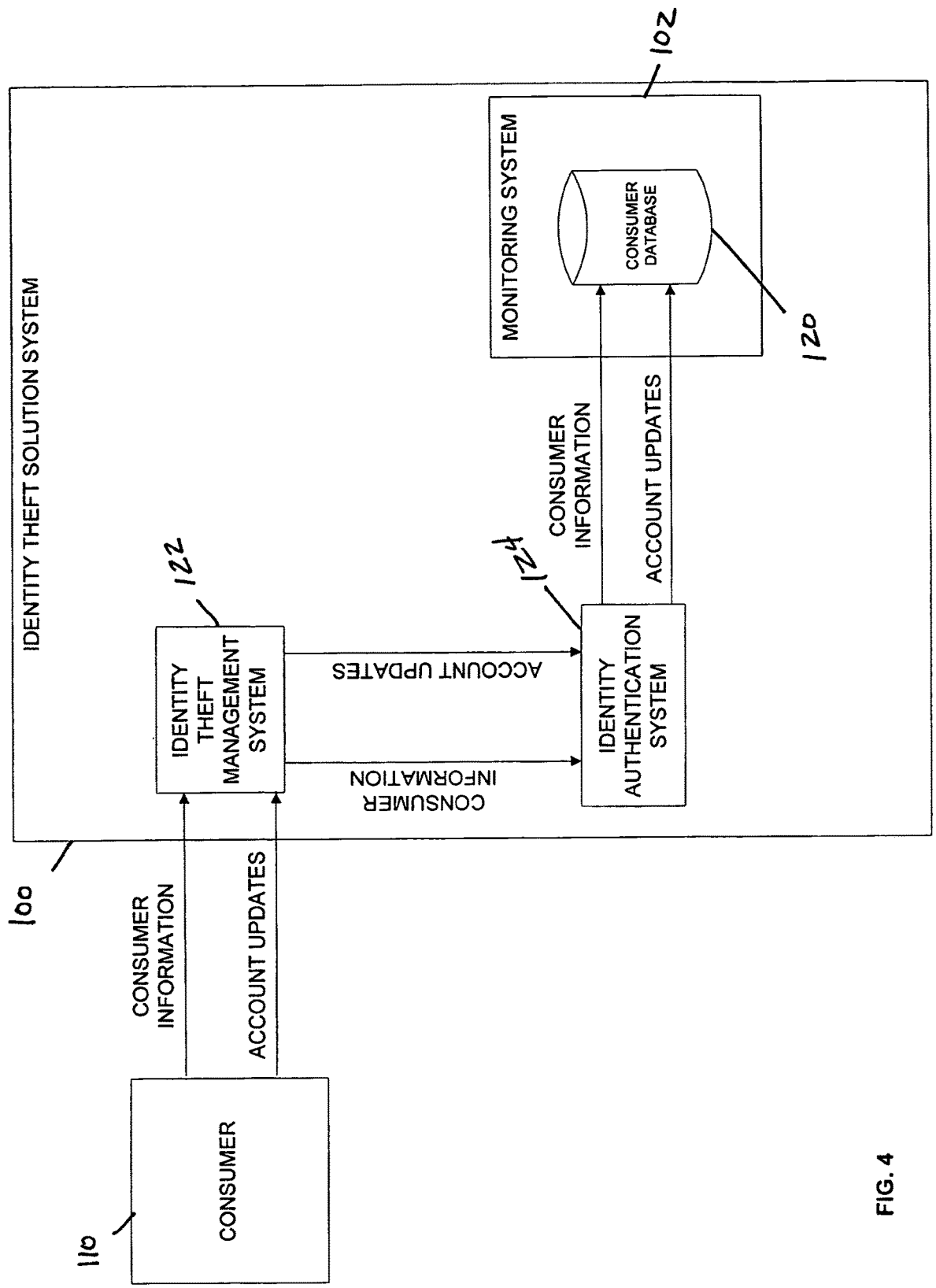
FIG. 4 illustrates a method of enrolling in the identity theft solution system of FIG. 2.

FIGS. 3 and 4 illustrate methods of enrolling with the identity theft solution system 100. As described above with respect to FIG. 1, in some embodiments, the consumer 110 can contact a participating vendor 112, such as a financial institution, to enroll in the identity theft solution system 100. The vendor 112 can obtain consumer information, such as name, social security number, driver's license number, financial account numbers, mailing address, email address, etc. As shown in FIG. 3, the vendor 112 can forward the consumer information to an identity theft management system 122, such as systems provided by Identity Safeguards[SM] that provide protection and recovery services.

In some embodiments, the vendor 112 can also direct the consumer 110 to directly provide consumer information to the identity theft management system 122, as shown in FIG. 4. In some embodiments, the identity theft management system 122 includes a consumer interface, such as a website, that the consumer 110 can use to provide consumer information. The consumer information that can be transmitted to the identity theft management system 122 over a network, such as the Internet. In some embodiments, the consumer information can be encrypted before being transmitted.

Figure 5:
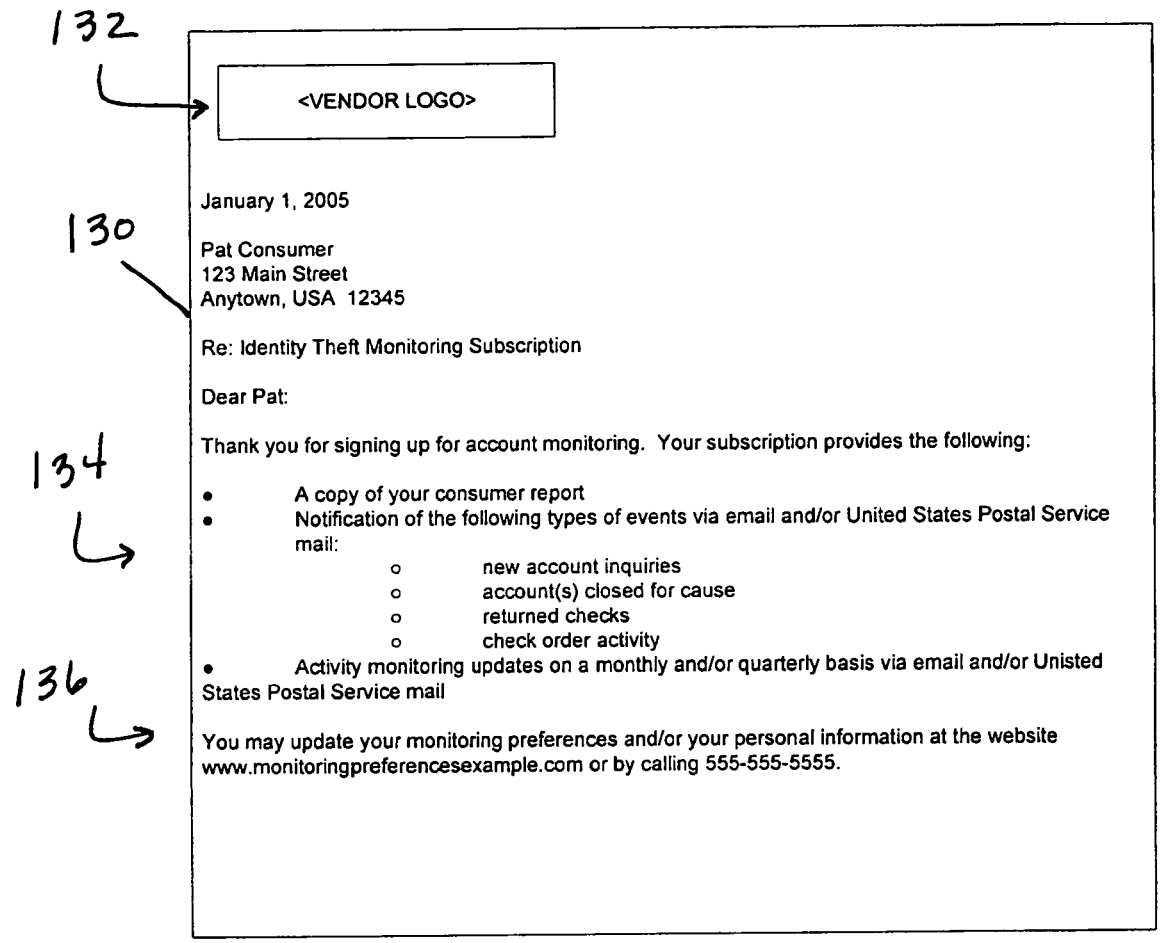
FIG. 5 illustrates enrollment welcome correspondence according to one embodiment of the invention.

The identity theft management system 122 can use the consumer information to generate program information, such as a username, a password, registration information, and/or instructions. The program information can be provided to the consumer 110. In some embodiments, the program information can be included in an enrollment welcome correspondence 130 (as shown in FIG. 5) provided to the consumer via a postal service and/or an email service from the identity theft management system 122. The identity theft management system 122 can also indirectly provide the program information to the consumer 110 through the vendor 112. In some embodiments, the program information can be formatted according to the vendor 112 through which the consumer 110 initiated the enrollment. For example, letterhead, envelopes, wording, etc., used to provide the program information to the consumer 110 can be customized based on the vendor 112 that provided the consumer information to the identity theft management system 122 or directed the consumer 110 to the identity theft management system 122. As shown in FIG. 5, the welcome correspondence 130 can include vendor customizations 132, such as a vendor logo, and program information 134. In some embodiments, the enrollment welcome correspondence 130 includes inquiry information 136. The inquiry information 136 can include contact information, action steps, etc., for the consumer 110 to take if he or she has questions and/or comments regarding the program information 134.

Rather than indirectly enrolling with the identity theft solution system 100 through the vendor 112, in some embodiments, the consumer 110 can directly enroll with the identity theft solution system 100 without being associated with a vendor, and can directly provide consumer information to the identity theft management system 122. In some embodiments, the identity management system 122 can include a consumer interface, such as a website, which the consumer 110 can use to provide consumer information directly to the identity theft management system 122. The consumer information can be transmitted to the identity theft management system 122 over a network, such as the Internet. In some embodiments, the consumer information can be encrypted before being transmitted to the identity theft management system 122.

In some embodiments, the identity theft management system 122 transmits consumer information to the monitoring system 102. The identity theft management system 122 can transmit the information to the monitoring system 102 over a network, such as the Internet or a LAN. The identity theft management system 122 can also transmit the consumer information to the monitoring system via mail, telephone, and/or facsimile. In some embodiments, the identity theft management system 122 encrypts the consumer information before transmitting it to the monitoring system 102.

The monitoring system 102 can store the consumer information in the consumer database 120. In some embodiments, the monitoring system 102 or the identity theft solution system 100 also stores the consumer information to another database, such as a master consumer database. The master consumer database can be used by other systems of the identity theft solution system 100 and/or other systems external to the identity theft solution system 100.

In some embodiments, the identity theft management system 122 sends consumer information to an identity authentication system 124. As described below, the identity authentication system 124 can use the consumer information to register the consumer 110. The identity management system 122 can transmit the consumer information to the identity authentication system 124 over a network, such as the Internet or a LAN. The identity management system 122 can also transmit the consumer information to the identity authentication system 124 via mail, telephone, and/or facsimile. In some embodiments, the identity theft management system 122 encrypts the consumer information before transmitting the information to the identity authentication system 124.

The consumer 110 can use the program information provided from the identity theft management system 122 to register with the identity theft solution system 100. In some embodiments, the consumer 110 can use the username and/or password included in the program information to access an identity authentication system 124. In some embodiments, the identity authentication system 124 can include a credit or debit monitoring system, such as TrueCredit^SM a subsidiary of TransUnion™. The identity authentication system 124 uses known information of a consumer, such as credit information regarding a mortgage, one or more credit cards, a car loan, a student loan, etc., to authenticate the consumer 110 enrolling with the identity theft solution system 100. In some embodiments, the identity authentication system 124 can provider a consumer interface, such as a website, where the consumer 110 can use the program information to access the identity authentication system 124. Once accessed, the consumer 110 can provide consumer information. The consumer information can include authentication information that the identity authentication system 124 can use to authenticate that the consumer 110 is who he or she states that they are. If the consumer 110 cannot provide correct predetermined information that is known by the identity authentication system 124, the consumer 110 is not authenticated and, in some embodiments, is denied enrollment with the identity theft solution system 100. Consumer information provided to the consumer interface of the identity authentication system 124 can be transmitted to the monitoring system 102 and/or the identity authentication system 124. In some embodiments, the consumer information can be transmitted over a network, such as the Internet or a LAN. The consumer information can be encrypted before being transmitted in order to increase the security of the consumer information.

The consumer information obtained by the identity authentication system 124 can also obtain information regarding parameters for interacting with the identity theft solution system 100. For example, the identity authentication system 124 can obtain one or more destinations where notifications generated with the identity theft solution system 100 can be sent (e.g., mailing addresses, email addresses, telephone numbers, facsimile numbers, etc.). The identity authentication system 124 can also obtain consumer preferences, such as how notifications should be routed (e.g., email only, email and postal mailing, etc.), how often notifications should be routed (e.g., daily, weekly, monthly, etc.), what types of events should be monitored (e.g., account inquiry events only, all types of event, etc.), if no-activity notifications should be generated if applicable, and/or an extent of time that the consumer should be enrolled with the identity theft solution system 100.

In some embodiments, the consumer 110 can also use the identity authentication system 124 to provide updated consumer information to the identity theft solution system 100.

In some embodiments, in addition to being authenticated, the consumer 110 can be required to sign or agree to a data contribution agreement ("DCA"). The DCA can state that the consumer 110 gives consent to the identity theft solution system 100 to use or review their financial information. In some embodiments, the FCRA can require a DCA for each consumer. The identity theft solution system 100 can also enter into DCAs with the vendor 112 and/or the one or more event providers 103 in order to processing provided information.

If the consumer 110 is authenticated by the identity authentication system 124, the identity authentication system 124 sends consumer information obtained from the consumer 110 and/or the identity management system 122 to the monitoring system 102. In some embodiments, the identity authentication system 124 can transmit consumer information to the monitoring system 102 over a network, such as the Internet or a LAN. The identity authentication system 124 can also transmit consumer information to the monitoring system 102 via mail, telephone, and/or facsimile. In some embodiments, the identity authentication system 124 can encrypt consumer information before transmitting it to the monitoring system, as described below with respect to FIG. 6.

In some embodiments, the identity authentication system 124 can transmit a file or record to the monitoring system 102 that includes consumer information. In some embodiments, the identity authentication system 124 can use a file transport protocol ("FTP") to transmit the consumer information. For example, the identity authentication system 124 can send individual files to the monitoring system 102 for each authenticated consumer in real-time as consumers are authenticated. The identity authentication system 124 can also send a file including a batch of records containing consumer information for zero or more authenticated consumers at periodic frequencies, such as once a day. Table 1 (below) illustrates a file format for transmitting consumer information from the identity authentication system 124 to the monitoring system 102 according to one embodiment of the invention.

TABLE 1

| Field Name | Format/Value List/Special Notes | Description |
| --- | --- | --- |
| Header Segment | | |
| Segment Identifier | Constant | Constant used to identify "header" segment. |
| File Identifier | Constant | Value that instructs monitoring system of business rules to apply depending on information contained in the file. |
| Consumer Identifier | — | Consumer security code as assigned by monitoring system. |
| File Sequence Number | Sequential numbers starting with 1, unique to information provider. | Number to eliminate duplicate file processing. |
| File Create Date | Format: HHMMSS | Date the file was generated. |
| File Create Time | Format: YYYYMMDD | Time the file was generated. |
| File Version Number | Constant | Version number of the file layout. |
| Product Code | FI - FI Initiated CI - Consumer Initiated | Two character code for product or service provided. |
| 3rd Party Consumer Identifier | — | 3rd party consumer security code (e.g., FI security code) as assigned by monitoring system. |

TABLE 1-continued

| Field Name | Format/Value List/Special Notes | Description |
|---|---|---|
| Correction Code | Value:<br>N = Not a Correction file (default)<br>Y = Correction file | Code value to indicate whether the file is to be considered a correction file for a file that was previously transmitted. |
| Filler | Set to spaces. | — |
| Batch Control Number | — | Monitoring system internally assigned control number for the file that was used to create this file. |
| Filler | Set to spaces. | — |
| Trailer Segment | | |
| Segment Identifier | Constant | Constant used to identify "trailer" segment. |
| File Create Time | Format: HHMMSS | Time the file was generated. |
| File Create Date | Format: YYYYMMDD | Date the file was generated. |
| Total Detail Record Quantity | | Total number of records included in the file excluding the header and trailer. |
| Filler | Set to spaces. | — |
| Detail Segment | | |
| Transaction Type Code | Value:<br>I = Insert<br>U = Update<br>D = Delete<br>N = Not used | Encoded value which describes the kind of action that the monitoring system should take on this record. |
| Consumer Record Identifier | — | Consumer-assigned identifier for tracking purposes. |
| Consumer Group Code | — | Identifier assigned by the consumer's internal system (e.g., a FI) that facilitates the grouping of participants for tracking purposes. |
| Participant Identifier | — | Identifier assigned by the consumer's (e.g., FI) internal system to uniquely identify the consumer identified in this record. |
| Filler | — | — |
| Solution Subscription Effective Date | Format: CCYYMMDD | Calendar day when the consumer's subscription becomes effective. |
| Solution Subscription Expiration Date | Format: CCYYMMDD | Calendar day when the consumer's subscription expires. |
| Routing and Transit Number (Bank Code and Bank Check Digit Code) | — | Routing and transit number (which is associated with an account number) that identifies the FI that issued the account to the consumer (e.g., combination of a FI code and a check digit code (e.g., last digit) assigned by the American Bankers Association). |
| Account Number | — | Demand deposit account number that was assigned by the FI to the account (e.g., checking account number appearing on a check). |
| Name Format Type Code | Value:<br>P = Parsed<br>L = Last Name First<br>F = First Name First<br>B = Business Name | Code that indicates a format of the name information. |
| Name Text | Data element used for name format type of 'L', 'F', or 'B'. Preferred name format: first, middle, last, OR the last name followed by a comma, then first and middle name. If a generational or professional designation is specified, it follows the last name.<br>Examples:<br>Gallagher III, Frederick John<br>Smith MD, Joseph Alfred | Consumer's full name. |
| Title Text (prefix) | Examples:<br>Mr<br>Mrs<br>Miss<br>Dr<br>Honorable<br>Rev<br>Colonel | Abbreviations, words, and phrases used to represent a designation of dignity, honor, rank, office, precedent, privilege, or attainment. |

TABLE 1-continued

| Field Name | Format/Value List/Special Notes | Description |
|---|---|---|
| First Name | Present if Name Format Type Code is 'P'. | First name of the consumer as contributed by the consumer. |
| Middle Name | — | Middle name of the consumer as contributed by the consumer. |
| Last Name | Present if Name Format Type Code is 'P'. May contain generation notation and/or professional designation if the consumer does not provide this information as separate data elements. | Last name of the consumer as contributed by the consumer. |
| Generation Text | Information may have been contributed as part of the consumer's last name. Examples: Jr Sr I II III IV | Information used to further distinguish one person from another. This information is usually found in the trailing information of one's name and indicates a relationship to parentage. Used with Name Format Type Code = 'P'. |
| Suffix Text | Information may have been contributed as part of the consumer's last name. Examples: MD PHD DDS MA ESQ MSW | Words, phrases, or common abbreviations affixed at the end of a person's name that are used to further distinguish and identify a unique person. These are frequently earned designations or certifications. Used with Name Format Type Code = 'P'. |
| Social Security Number | Format: 999999999 | Social Security number that the federal government assigned to the consumer named in this record. |
| Birth Date | Format: YYYYMMDD | Birth date of the consumer named in this record. Used with Name Format Type Code = 'P'. |
| Driver's License Province/State Code | Must be present if driver's license number is present. See Appendix XX for Valid DL State Codes. | Standard postal service state abbreviation for the state that issued the driver's license to the consumer named in this record. Used with Name Format Type Code = 'P'. |
| Driver's License Number | Present if driver's license state code is present | Driver's license number that the state issued to the consumer named in this record. Used with Name Format Type Code = 'P'. |
| Address Line 1 Text | Examples: Street Address - 123 S Main St NW Apt 12B PO Box - PO Box 44 Rural Route - Rt 29, Box 1B | Mailing address for the consumer named in this record. Used with Name Format Type Code = 'P'. |
| Address Line 2 Text | — | Second line of the mailing address. Used with Name Format Type Code = 'P'. |
| City Name | City specified if Postal Code is not specified. | City name for the address of the consumer named in this record. |
| Province/State Code | Province/State specified if Postal Code is not specified. | Standard postal service state abbreviation for the address of the consumer named in this record. |
| Postal Code | Format: US: 99999 or 999999999 Canada: ANA ANA Mexico: 99999 | Postal code (ZIP code) for the address of the consumer named in this record. |
| Country Code | — | Encoded value describing the country for the address of the consumer named in this record. |
| Address Line 1 Text 2 | Examples: Street Address - 123 S Main St NW Apt 12B PO Box - PO Box 44 Rural Route - Rt 29, Box 1B | Second address for the consumer named in this record. |
| Address Line 2 Text 2 | | Second line of the second address. |
| City Name 2 | City specified if ZIP code is not specified. | City name for the second address of the consumer named in this record. |
| Province/State Code 2 | Province/State Code specified if ZIP code is not specified. | Standard postal service state abbreviation for the second address of the consumer named in this record. |

TABLE 1-continued

| Field Name | Format/Value List/Special Notes | Description |
|---|---|---|
| Postal Code 2 | Format:<br>US: 99999 or 999999999<br>Canada: ANA ANA<br>Mexico: 99999 | Postal code (ZIP code) for the second address of the consumer named in this record. |
| Country Code 2 | — | Encoded value describing the country for the address of the consumer named in this record. |
| Contact Phone Number | Format: AAAPPPNNNN | Contact phone number of the named consumer to be used in the event the monitor notification results in undeliverable mail (email or letter). |
| Contact Email Address | Present if Notification Media Code is 'E'. | Consumer's email address that may be used to deliver monitoring notifications. |
| Notification Media Code | Value:<br>E = Email<br>L = Letter | Encoded value indicating the consumer's preference of media for receiving monitoring notifications. |
| Monitoring Notification Frequency Code | Value:<br>DLY = Daily<br>MTH = Monthly<br>WK = Weekly | Encoded value indicating the consumer's preference of frequency for receiving monitoring notifications. |
| No Activity Monitoring Notification Code | Value:<br>Y = Yes<br>N = No | Encoded value indicating the consumer's preference for receiving 'no activity' monitoring notifications. |
| No Activity Monitoring Notification Frequency Code | Value:<br>MTH = Monthly<br>QTR = Quarterly | Encoded value indicating the consumer's preference of frequency for receiving 'no activity' monitoring notifications. |

As shown in Table 1, a file transmitted by the identity authentication system 124 can include a single header segment, a single trailer segment, and zero or more detail segments. The file can include a detail segment for each authenticated consumer.

Figure 6:
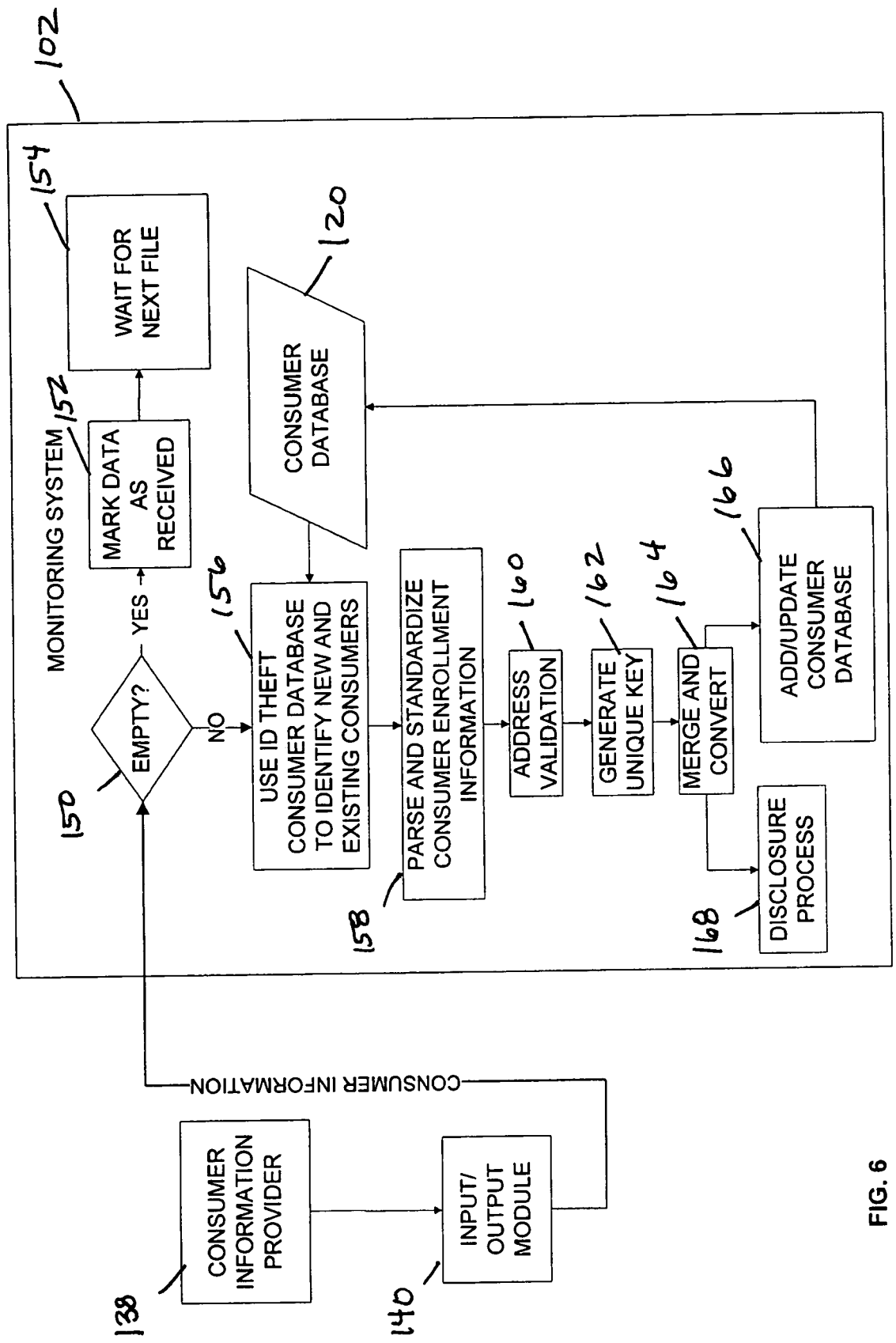
FIG. 6 illustrates a method of receiving consumer information with an identity theft solution system according to one embodiment of the invention.

FIG. 6 illustrates a method of transmitting consumer information to the monitoring system 102. The consumer information can include initial enrollment consumer information and/or updated consumer information. As shown in FIG. 6, a consumer information provider 138, such as the consumer 110, the vendor 112, the identity management system 122, and/or the identity authentication system 124 can transmit consumer information. An input/output module 140, situated between the consumer information provider 138 and the monitoring system 102, can receive consumer information from the consumer information provider 138 and can process consumer information. In some embodiments, the consumer information provider 138 can encrypt consumer information before transmitting the information, and the input/output module 140 can decrypt the consumer information. The monitoring system 102 can receive consumer information from multiple sources and each source can transmit (e.g., encrypt, format, etc.) consumer information differently. The input/output module 140 can receive the consumer information from each source and can decrypt, validate, and/or process the consumer information from each source as needed. The input/output module 140 can then forward the processed consumer information to the monitoring system 102. It should be understood that although the input/output module 140 is illustrated as a separate component, the input/output module can be included in the monitoring system 102 and/or the identity theft solution system 100.

As shown in FIG. 6, once the monitoring system 102 receives consumer information, the monitoring system 102 can determine if the information is "empty" (step 150). As described above, the consumer information provider 138 can transmit a file periodically, such as once a day, that includes consumer information related to each consumer authenticated since the last file transmission, such as over the past 24 hours. If no consumers have been authenticated since the last file transmission, the information transmitted from the consumer information provider 138 can be "empty" (i.e., includes no consumer information).

If the information transmitted from the consumer information provider 138 is "empty", the monitoring system 102 can mark the information as received (step 152). In some embodiments, marking the information as received can include logging the receipt of the information in a log file of the monitoring system 102. The monitoring system 102 can also send an acknowledgement to the consumer information provider 138. The monitoring system 102 can wait for additional information from the consumer information provider 138 and/or another information source (step 154).

If the information transmitted from the consumer information provider 138 is not "empty", the monitoring system 102 can identify consumer information for new consumers and updated consumer information for existing enrolled consumers included in the information (step 156). In some embodiments, the consumer information received from the consumer information provider 138 can include updated consumer information, such as address updates, email address updates, etc., for existing enrolled consumers and/or new consumer information. The monitoring system 102 can use the consumer database 120 to determine new consumer information and updated consumer information.

As shown in FIG. 6, the monitoring system 102 can parse and/or standardize consumer information, such as consumer names and/or addresses (step 158). In some embodiments, the monitoring system 102 parses and standardizes consumer information into a format usable with the identity theft solution system 100, and, in particular, with the monitoring system 102.

In some embodiments, the monitoring system 102 can validate consumer information (step 160). For example, the monitoring system 102 can validate that a mailing address includes a correct corresponding zip code or that a phone number has a correct area code.

Before storing the consumer information to the consumer database 120, the monitoring system 102 can generate a unique key for each consumer identified in the consumer information (step 162). In some embodiments, the key is generated using a formula that uses consumer information of a specific consumer, such as first name, last name, name suffix, social security number, address, etc., in order to uniquely generate a key for the consumer. As described below, the monitoring system 102 can generate keys for incoming events using the same formula and can match keys between events and registered consumers in order to determine if a screened event is associated with an enrolled consumer.

In some embodiments, information regarding a particular consumer can be provided from one or more sources, and the monitoring system 102 can merge and/or convert consumer information regarding a particular consumer (step 164). For example, consumer information for a particular consumer can be provided from the vendor 112, the identity management system 124, the identity authentication system 124, and/or another consumer information provider 138 and the monitoring system can merge or combine the data from each source. Consumer information transmitted from the consumer information provider 138 can also include multiple records associated with a particular consumer. For example, a consumer can provide initial enrollment information and updated information and the information for both transactions can be included in a daily batch file transmitted from the consumer information provider 138. The monitoring system 102 can merge the information so that a fewer number of database inserts or updates are required in order to store consumer information to the consumer database 120.

As shown in FIG. 6, at step 166, the monitoring system 102 can add and/or update the consumer database 120 using the consumer information. Adding a new consumer to the consumer database 120 can establish a consumer as enrolled consumers of the identity theft solution system 100 and, once a consumer is enrolled, the monitoring system 102 can initiate monitoring of financial information associated with the consumer.

Figure 7:
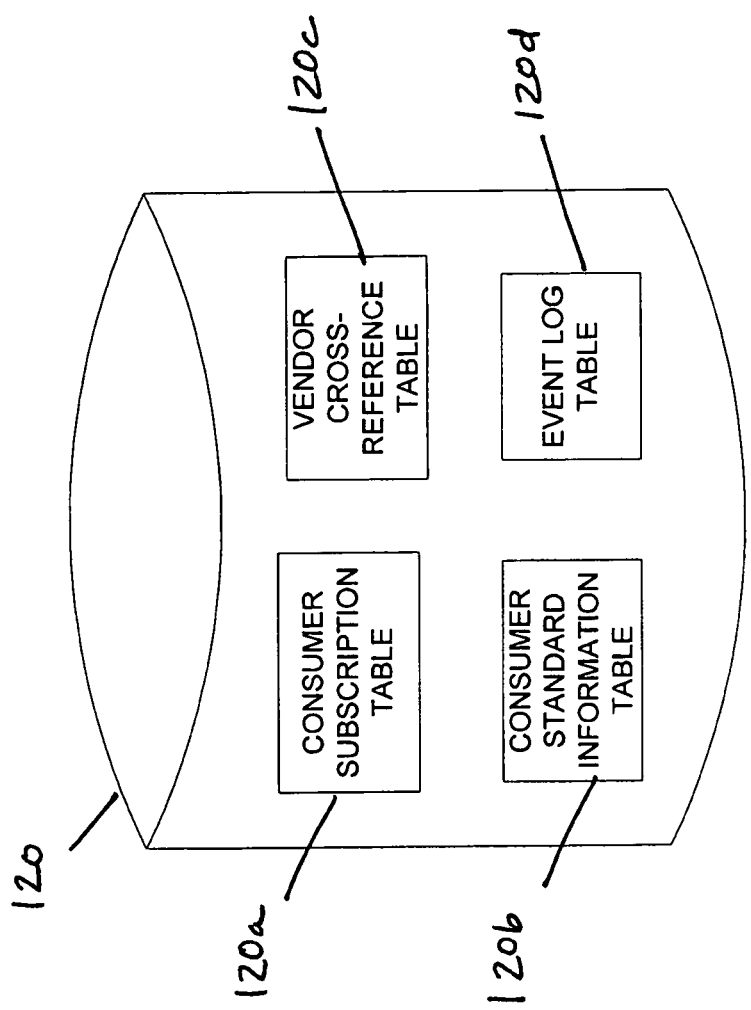
FIG. 7 illustrates a consumer database according to one embodiment of the invention.

In some embodiments, as shown in FIG. 7, the consumer database 120 can include a consumer subscription information table 120a, a consumer standard information table 120b, a vendor cross-reference information table 120c, and an event log table 120c. The consumer subscription information table 120a can store information identifying a consumer that is enrolled with the identity theft solution system 100. The consumer standard information table 120b can store consumer information that has been standardized for use with the identity theft solution system 100. In some embodiments, the consumer standard information table 120b can include the key generated with the monitoring system 102 that uniquely identifies a consumer. The vendor cross-reference information table 120c can store reference information regarding vendors of the identity theft solution system 100, such as financial institutions. As described above, individual consumers can be associated with a particular vendor and correspondence transmitted from the identity theft solution system 100 can include vendor customizations, such that the correspondence appears to be transmitted from a vendor. The event log table 120d can store events screened with the monitoring system 102 and/or events reported to a consumer in a notification. Tables 2-5 (below) illustrate database table structures of the consumer subscription information table 120a, the consumer standard information table 120b, the consumer cross-reference information table 120c, and the event log table 120d, according to one embodiment of the invention.

TABLE 2

Consumer Subscription Information Table

| Column | Format | Business Description | Comments |
|---|---|---|---|
| VENDOR_GROUP_ID | INTEGER(5) | Identifier assigned by vendor's internal system (e.g., a financial institution), which facilitates the grouping of consumers for tracking purposes. | — |
| PARTICIPANT_ID | INTEGER(5) | Identifier assigned by vendor's internal system to uniquely identify consumer identified in this record. | — |
| VENDOR_ID | INTEGER(8) | Unique identifier of the vendor who provided this record. | — |
| EFFECTIVE_DT | DATE | Calendar day when the consumer's subscription becomes effective. | — |
| EXPIRY_DT | DATE | Calendar day when the consumer's subscription expires. | — |
| GOVT_NBR | CHAR(12) | Instance of a unique id used by a government to track the consumer. | — |
| TITLE_TXT | CHAR(15) | Abbreviations, words, and phrases used to represent a designation of dignity, honor, rank, office, precedent, privilege, or attainment. | — |
| FIRST_NM | CHAR(64) | One or more letters or words used with other following letters and/or words to distinctively designate the consumer. | — |
| MID_NM | CHAR(64) | One or more letters or words used with other following letters and/or words to distinctively designate the consumer. | — |
| LAST_NM | CHAR(64) | One or more letters or words used with other following letters and/or words to distinctively designate the consumer. | — |
| GENRN_TXT | CHAR(3) | Information used to further distinguish a one consumer from another. This information is usually found in the | — |

TABLE 2-continued

Consumer Subscription Information Table

| Column | Format | Business Description | Comments |
| --- | --- | --- | --- |
| | | trailing information of one's last name and indicates a relationship to parentage. | |
| BRTH_DT | DATE(8) | Calendar day when the consumer was born. | — |
| DL_ST_PROV_CD | CHAR(64) | Reference to state assigning a driver's license number to the consumer. | — |
| DL_NBR | CHAR(64) | State registered code indicating permission for the consumer to operate a motorized vehicle. | — |
| ADDR1_LINE1 | CHAR(64) | Mailing address for the consumer. | — |
| ADDR1_LINE2 | CHAR(64) | Second line of the mailing address for the consumer. | — |
| CITY_NM1 | CHAR(64) | Words and phrases used in conjunction with a state to uniquely identify a geo-political area. | — |
| ST_PROV_CD1 | CHAR(15) | Two character abbreviation identifying a geo-political area. | — |
| PSTL_CD1 | CHAR(6) | Encoded value which identifies the delivery area of a sectional center facility or a major-city post office serving the delivery address area. | — |
| PSTL_PLUS_FOUR_CD1 | CHAR(4) | Expanded portion of a 9-digit postal code. First 2 digits designate a postal service sector and the last 2 digits designate a postal service segment. | — |
| CNTRY_CD1 | CHAR(3) | Encoded value representing the country associated with the consumer's address. | — |
| ADDR2_LINE1 | CHAR(64) | Second mailing address for the consumer. | — |
| ADDR2_LINE2 | CHAR(64) | Second line of second mailing address. | — |
| CITY_NM2 | CHAR(64) | Words and phrases used in conjunction with a state to uniquely identify a geo-political area within the jurisdiction for second address. | — |
| ST_PROV_CD2 | CHAR(15) | Two character abbreviation identifying a geo-political area for second address. | — |
| PSTL_CD2 | CHAR(6) | Encoded value that identifies delivery area of a sectional center facility or a major-city post office serving the delivery address area for second address. | — |
| PSTL_PLUS_FOUR_CD2 | CHAR(4) | Expanded portion of a 9-digit postal code. First 2 digits designate a postal service sector and the last 2 digits designate a postal service segment. | — |
| PHN_NBR | CHAR(10) | Identifier for a telecommunications device located with a geographic area. | Format: AAAPPPNNNN |
| EMAIL | CHAR(50) | Consumer's email address which may be used to deliver monitoring notifications. | — |
| BATCH_CNTRL_NBR | INTEGER(9) | Internally generated number uniquely identifying an instance of a source file that was used to last maintain this instance. | — |
| UPDATE_TS | TIMESTAMP | Calendar time stamp to indicate when the change to this row was performed. | — |

TABLE 3

Consumer Standard Information Table

| Column | Format | Business Description | Comments |
| --- | --- | --- | --- |
| VENDOR_GROUP_CD | INTEGER(5) | Identifier assigned by vendor's internal system, which facilitates the grouping of participants for tracking purposes. | — |
| PARTICIPANT_ID | INTEGER(5) | Identifier assigned by vendor's internal system to uniquely identify the consumer. | — |
| VENDOR_ID | INTEGER(8) | Unique identifier of vendor who provided this record. | — |

TABLE 3-continued

Consumer Standard Information Table

| Column | Format | Business Description | Comments |
|---|---|---|---|
| EFFECTIVE_DT | DATE | Calendar day when the consumer's subscription becomes effective. | — |
| EXPIRY_DT | DATE | Calendar day when the consumer's subscription expires. | — |
| STD_FIRST_NM | CHAR(20) | One or more letters or words used with other following letters and/or words to distinctively designate the consumer. | — |
| STD_MID_NM | CHAR(20) | One or more letters or words used with other following letters and/or words to distinctively designate the consumer. | — |
| STD_LAST_NM | CHAR(30) | One or more letters or words used with other following letters and/or words to distinctively designate the consumer. | — |
| STD_GENRN_TXT | CHAR(3) | Information used to further distinguish one consumer from another. This information is usually found in the trailing information of one's last name and indicates a relationship to parentage. | — |
| STD_DL_ST_PROV_CD | CHAR(5) | Reference to a state assigning a drivers license number to the consumer. | — |
| STD_DL_NBR | CHAR(25) | State registered code indicating permission for the consumer to operate a motorized vehicle. | — |
| STD_GOVT_1_NBR | INTEGER(9) | Instance of a unique id used by a government to track the consumer. | — |
| BRTH_DT | DATE(8) | Calendar day depicting when the consumer was born. | — |
| STD_ADDR_TXT1 | CHAR(99) | Words, letters, numbers or phrases used to uniquely identify a thoroughfare in a city, town, or other geo-political area. | — |
| STD_CITY_NM1 | CHAR(30) | Words and phrases used in conjunction with a state to uniquely identify a geo-political area. | — |
| STD_ST_PROV_CD1 | CHAR(5) | Abbreviation identifying a geo-political area. | — |
| STD_PSTL_CD1 | CHAR(7) | Encoded value which identifies the delivery area of a sectional center facility or a major-city post office serving the delivery address area. | — |
| STD_ADDR_TXT2 | CHAR(99) | Words, letters, numbers or phrases used to uniquely identify a thoroughfare in a city, town, or other geo-political area. | — |
| STD_CITY_NM2 | CHAR(30) | Words and phrases used in conjunction with a state to uniquely identify a geo-political area. | — |
| STD_ST_PROV_CD2 | CHAR(5) | Abbreviation identifying a geo-political area. | — |
| STD_PSTL_CD2 | CHAR(7) | Encoded value that identifies delivery area of a sectional center facility or a major-city post office serving the delivery address area. | — |
| STD_PHN_1_AREA_CD | SMALLINT(3) | Code assigned by a telephone company that relates an associated telecommunications device identifier to a geographical area. | — |
| STD_PHN_1_PRFX_NBR | SMALLINT(3) | Code assigned by a telephone company that relates an associated telecommunications device identifier to a geographical area. | — |
| STD_PHN_1_NBR | SMALLINT(4) | Code assigned by a telephone company that relates an associated telecommunications device identifier to a geographical area. | — |
| DBCID | DECIMAL 13 | Unique consumer database identifier (key). | — |
| CNSMR_EVNT_ID1 | DECIMAL 10 | Consumer event identifier 1 | — |
| CNSMR_EVNT_ID2 | DECIMAL 11 | Consumer event identifier 2 | — |
| EMAIL | CHAR(50) | Consumer's email address that may be used deliver monitoring notifications | — |
| NOTIFICATION_CD | CHAR(1) | Encoded value indicating the consumer's preference of media for receiving monitoring notifications. | Value:<br>E = Email<br>L = Letter |

TABLE 3-continued

Consumer Standard Information Table

| Column | Format | Business Description | Comments |
|---|---|---|---|
| NOTIFICATION_FREQ | CHAR(4) | Encoded value indicating the consumer's preference of frequency for receiving monitoring notifications. | Value:<br>DLY = Daily<br>MTH = Monthly<br>WK = Weekly |
| NO_ACTVTY_CD | CHAR(1) | Encoded value indicating the consumer's preference of media for receiving monitoring notifications. | Value:<br>Y = Yes<br>N = No |
| NO_ACTVTY_FREQ | CHAR(4) | Encoded value indicating the consumer's preference of frequency for receiving 'no activity' monitoring notifications. | Value:<br>MTH = Monthly<br>QTR = Quarterly |
| PRODUCT_CD | CHAR(2) | Two character code for product or service provided. | Value:<br>FI - FI Initiated<br>CI - Consumer Initiated |
| BATCH_CNTRL_NBR | INTEGER(9) | Internally generated number uniquely identifying an instance of a source file that was used to last maintain this instance. | — |
| UPDATE_TS | TIMESTAMP | Calendar time stamp to indicate when the change to this row was performed. | — |

TABLE 4

Vendor Cross-Reference Information Table

| Column | Format | Business Description | Comments |
|---|---|---|---|
| VENDOR_GROUP_CD | INTEGER(5) | Identifier assigned by vendor's internal system, which facilitates the grouping of participants for tracking purposes. | — |
| VENDOR_ID | INTEGER(8) | Unique identifier of vendor who provided this record. | — |
| EFFECTIVE_DT | DATE | Calendar day when vendor subscription becomes effective. | — |
| EXPIRY_DT | DATE | The calendar day when vendor subscription expires. | — |
| LOGO_ID | CHAR(24) | Identifier of the logo that print vendor is to use when constructing letter from vendor. | — |
| UPDATE_TS | TIMESTAMP | Calendar time stamp to indicate when the change to this row was performed. | — |

TABLE 5

Event Log Table

| Column | Format | Business Description | Comments |
|---|---|---|---|
| VENDOR_GROUP_CD | INTEGER(5) | Identifier assigned by vendor's internal system, which facilitates the grouping of participants for tracking purposes. | — |
| PARTICIPANT_ID | INTEGER(5) | Identifier assigned by the vendor's internal system to uniquely identify the consumer. | — |
| VENDOR_ID | INTEGER(8) | Unique identifier of vendor who provided this record. | — |
| LOGO_ID | CHAR(24) | Identifier of a logo that print vendor is to use when constructing alert correspondence. | — |
| RPT_DT | DATE | Calendar date for the day the monitoring information was reported. | — |
| LOGGED_TIME | TIMESTAP | Calendar TIMESTAMP when the alert information is logged to the monitoring system. | — |
| LETTER_TYPE | CHAR(02) | Encoded value that describes the letter template to be used for this record. | Value:<br>AM = Alert Monitor<br>NM = No Activity Monitor |

TABLE 5-continued

Event Log Table

| Column | Format | Business Description | Comments |
| --- | --- | --- | --- |
| Contact_Email | CHAR(50) | Consumer's email address that may be used to deliver monitoring notifications. | — |
| Notification_Media_Cd | CHAR(1) | Encoded value indicating the consumer's preference of media for receiving monitoring notifications. | Value:<br>E = Email<br>L = Letter |
| Monitor_Result_Text1 | CHAR(100) | Textual comment 1 regarding what the monitoring service reported. | — |
| Monitor_Result_Text2 | CHAR(100) | Textual comment 2 regarding what the monitoring service reported. | — |
| Monitor_Result_Text3 | CHAR(100) | Textual comment 3 regarding what the monitoring service reported. | — |
| Monitor_Result_Text4 | CHAR(100) | Textual comment 4 regarding what the monitoring service reported. | — |
| Monitor_Result_Text5 | CHAR(100) | Textual comment 5 regarding what the monitoring service reported. | — |
| Monitor_Result_Text6 | CHAR(100) | Textual comment 6 regarding what the monitoring service reported. | — |
| Monitor_Result_Text7 | CHAR(100) | Textual comment 7 regarding what the monitoring service reported. | — |
| Monitor_Result_Text8 | CHAR(100) | Textual comment 8 regarding what the monitoring service reported. | — |
| Monitor_Result_Text9 | CHAR(100) | Textual comment 9 regarding what the monitoring service reported. | — |
| Monitor_Result_Text10 | CHAR(100) | Textual comment 10 regarding what the monitoring service reported. | — |
| ADDR1_LINE1 | CHAR(64) | Mailing address for the consumer. | — |
| ADDR1_LINE2 | CHAR(64) | Second line of the mailing address. | — |
| CITY_NM1 | CHAR(64) | Words and phrases used in conjunction with a state to uniquely identify a geo-political area. | — |
| ST_PROV_CD1 | CHAR(15) | Two-character abbreviation identifying a geo-political area. | — |
| PSTL_CD1 | CHAR(6) | Encoded value that identifies a delivery area of a sectional center facility or a major-city post office serving the delivery address area. | — |
| PSTL_PLUS_FOUR_CD1 | CHAR(4) | Expanded portion of a 9-digit postal code. First 2 digits designate a postal service sector and last 2 digits designate a postal service segment. | — |
| CNTRY_CD1 | CHAR(3) | Encoded value representing a country associated to the consumer's address. | — |

In some embodiments, the monitoring system 102 performs a disclosure process (step 168) as shown in FIG. 6 for an enrolled consumer. During the disclosure process, the monitoring system 102 can generate a report for the consumer, such as a debit report. The report can provide information regarding a consumer's credit and/or debit information which is of public record and/or is known by creditors and/or debitors. The report can also include the consumer information, or a portion thereof, that the consumer provided to the monitoring system 102. In some embodiments, the report can provide a list of all credit and/or debit related accounts, loans, mortgages, investments, etc. The report can include historical information such as opening dates, closing dates, recent activity, etc. The report can also include one or more credit and/or debit related scores, such as a credit score and/or a debit score. The score can indicate a consumer's likelihood to successfully manage an account. For example, a credit score can indicate a likelihood of a consumer to pay back a loan. The report can be provided to a consumer at the consumer's initial enrollment with the identity theft solution 100 and/or at periodic frequencies thereafter.

In some embodiments, before generating a report for a consumer, the monitoring system 102 can determine if a freeze has been enacted on the consumer's credit and/or debit information. A consumer can place a freeze on their credit and/or debit information in order to inhibit anyone, in particular, potential identity thieves from obtaining any of the consumer's credit and/or debit information or performing activities associated with the consumer's credit and/or debit information, such as opening a new account, changing an address, etc. If a freeze or alert has been placed on a consumer's credit and/or debit information, the monitoring system 102 can include the date of the freeze or the alert on the report or letter for the consumer that indicates that a freeze or alert is in place. If a freeze or alert is lifted, the monitoring system 102 can indicate the date the freeze or alert was lifted on the report or letter for the consumer.

Figure 8:
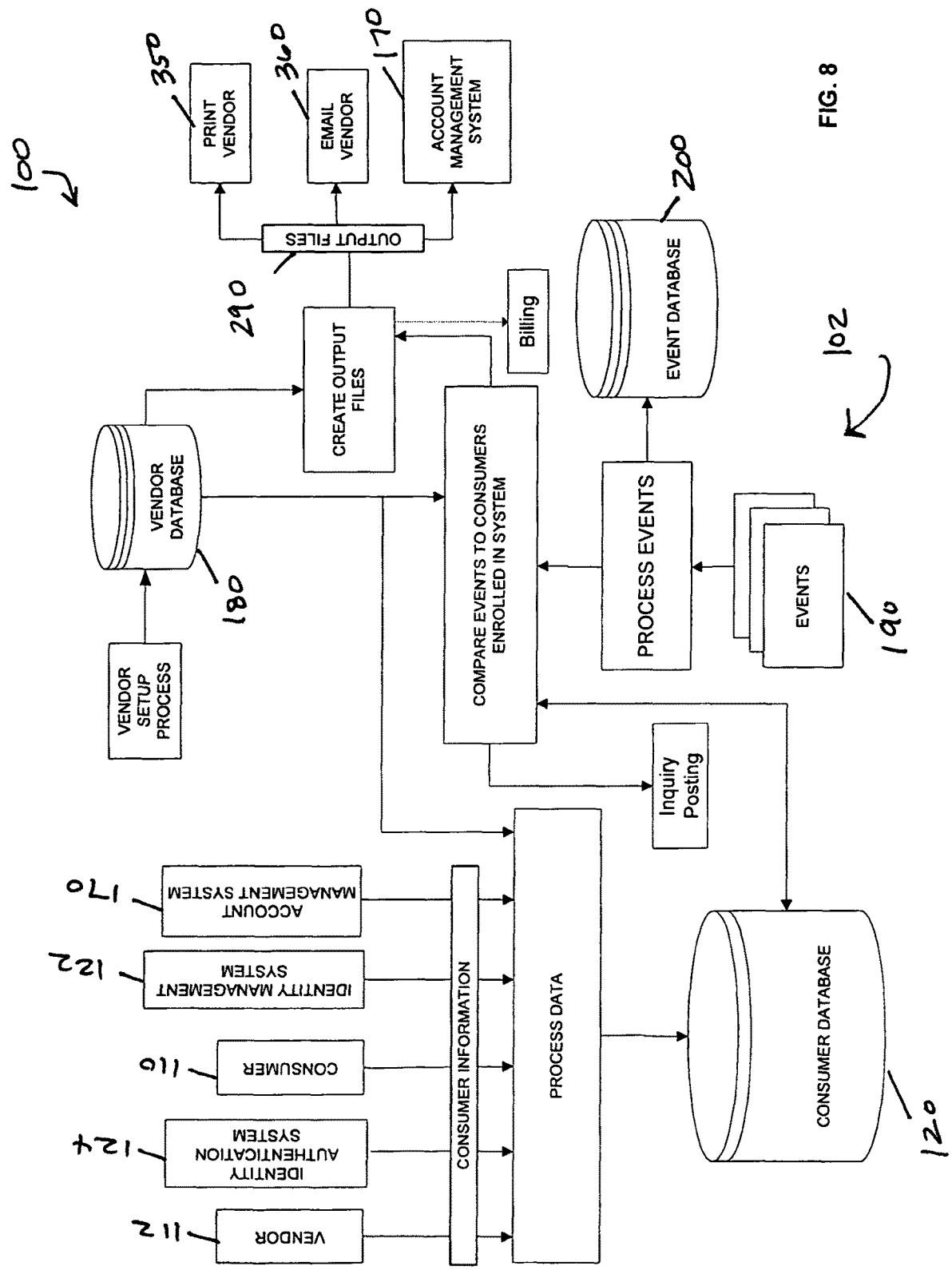
FIG. 8 illustrates functionality of an identity theft solution system according to one embodiment of the invention.

FIG. 8 illustrates the functionality of the identity theft solution system 100 according to one embodiment of the invention. As shown in FIG. 8, the identity theft solution system 100 receives consumer information from one or multiple sources. The sources of consumer information can include the vendor 112, the identity management system 122, the identity authentication system 124, and/or directly from the consumer 110. In some embodiments, consumer information can be transmitted from one or more account management systems 170. An account management system 170 can be managed by a financial institution and can track activity associated with one or more client accounts. In some embodiments, an account management system 170 can include a credit granting retailer or financial institution client, such as those provided by the Fair Issac Corporation. In contrast to the vendor 112, which can include a financial institution, that transmits consumer information on behalf of a consumer request, the account management system 170 can transmit consumer information for one or more client accounts on behalf of the financial institution managing client accounts. Using the consumer information, the monitoring system 102 can enroll each client, whose account information is included in the consumer information transmitted from the account management system 170, as a consumer, as described above with respect to FIGS. 3-6 for consumer-initiated enrollment requests. In some embodiments, the monitoring system 102 sends event files or reports to the account management system 170, or the financial institution managing the account management system 170 rather than sending notifications to each client enrolled through the account management system 170.

As shown in FIG. 8, in some embodiments, the monitoring system 102 can obtain information from a vendor database 180. The vendor database 180 can include vendor information, such as vendor name, billing address, billing preferences, pricing information, contact information, contract details, etc. The vendor database 180 can also include information regarding one or more account management systems 170. During a vendor setup process, authorized vendors can be established and information regarding each authorized vendor can be stored in the vendor database. The monitoring system 102 can use the vendor database 180 to validate consumers requesting enrollment. In some embodiments, only consumers requesting enrollment through authorized vendors are allowed to enroll with the identity theft solution system 100. Consumers attempting to enroll with the identity theft solution system through an unauthorized vendor can be denied enrollment. The monitoring system 102 can also use the vendor database 180 to determine monitoring preferences and/or billing and pricing options available or required for a consumer enrolling through a particular vendor. The monitoring system 102 can also use the vendor database 180 to determine whether details of a contract established with an authorized vendor are being upheld. For example, a contract established with a particular authorized vendor may limit the amount of consumers that can be enrolled with the identity theft solution system 100 and/or may set a time limit on an enrollment window when consumers can enroll. The monitoring system 102 can validate consumer information with regard to the vendor information.

As shown in FIG. 8, the monitoring system 102 can process consumer information, as described above with respect to FIGS. 3-6. The monitoring system 102 can stored the processed consumer information in the consumer database 120.

The monitoring system 102 can receive events 190 from one or more event providers 103. In some embodiments, the events 190 are associated with credit and/or debit accounts of consumers. As described above with respect to FIGS. 1 and 2, events 190 can be transmitted from one or more financial institutions 104, merchants 106, payment device providers 108, and/or other financial service providers, such as credit monitoring systems. In some embodiments, the events 190 can include voluntary and non-voluntary account closure events, new account inquire events, check order events, returned check events, account freeze information events (e.g., when an account freeze is placed and when an account freeze is lifted), and/or stolen or lost account information events, which can be issued when a credit and/or debit card or other account information that could potentially be used by an identity theft is lost or stolen. The events 190 can also include account closure deletes, collection events, payment events, inquiry delete events, and/or payment on returned check events.

Upon receiving the events 190, the monitoring system 102 processes the events 190 in order to determine if any events are associated with an enrolled consumer. In some embodiments, the monitoring system 102 can validate the events 190. For example, the monitoring system 102 can ensure that the events 190 were transmitted from an authorized source. The monitoring system 102 can also ensure that the events 190 are formatted and/or structured as required by the monitoring system 102.

In some embodiments, the monitoring system 102 can store the events 190, or a portion thereof, to an event database 200. The event database 200 can store screened events 190 and can be used with the monitoring system 102 and/or other components of the identity theft solution system 100.

The monitoring system 102 can also perform inquiry posting. Inquiry posting can be required by the FCRA and can require the monitoring system 102 to post or record the events 190 that it obtains and screens. In some embodiments, a consumer can request or inquire about the information obtained and screened with the monitoring system 102. The monitoring system 102 can use the events 190 posted during inquiry posting to construct a listing of information known and/or screened. The listing can then be provided to the consumer.

The monitoring system 190 can parse and/or standardize the events 190. As described above, the monitoring system 102 can generate a unique key for each event. The unique key can be generated based on consumer information included in each event. For example, the monitoring system 102 can use a consumer name, address, social security number, etc., included in an event to generate a unique key. The formula can be the same formula the monitoring system 102 uses to assign a unique key to a consumer. The monitoring system 102 can use the key to determine if an event 190 is associated with an enrolled consumer.

Figure 9:
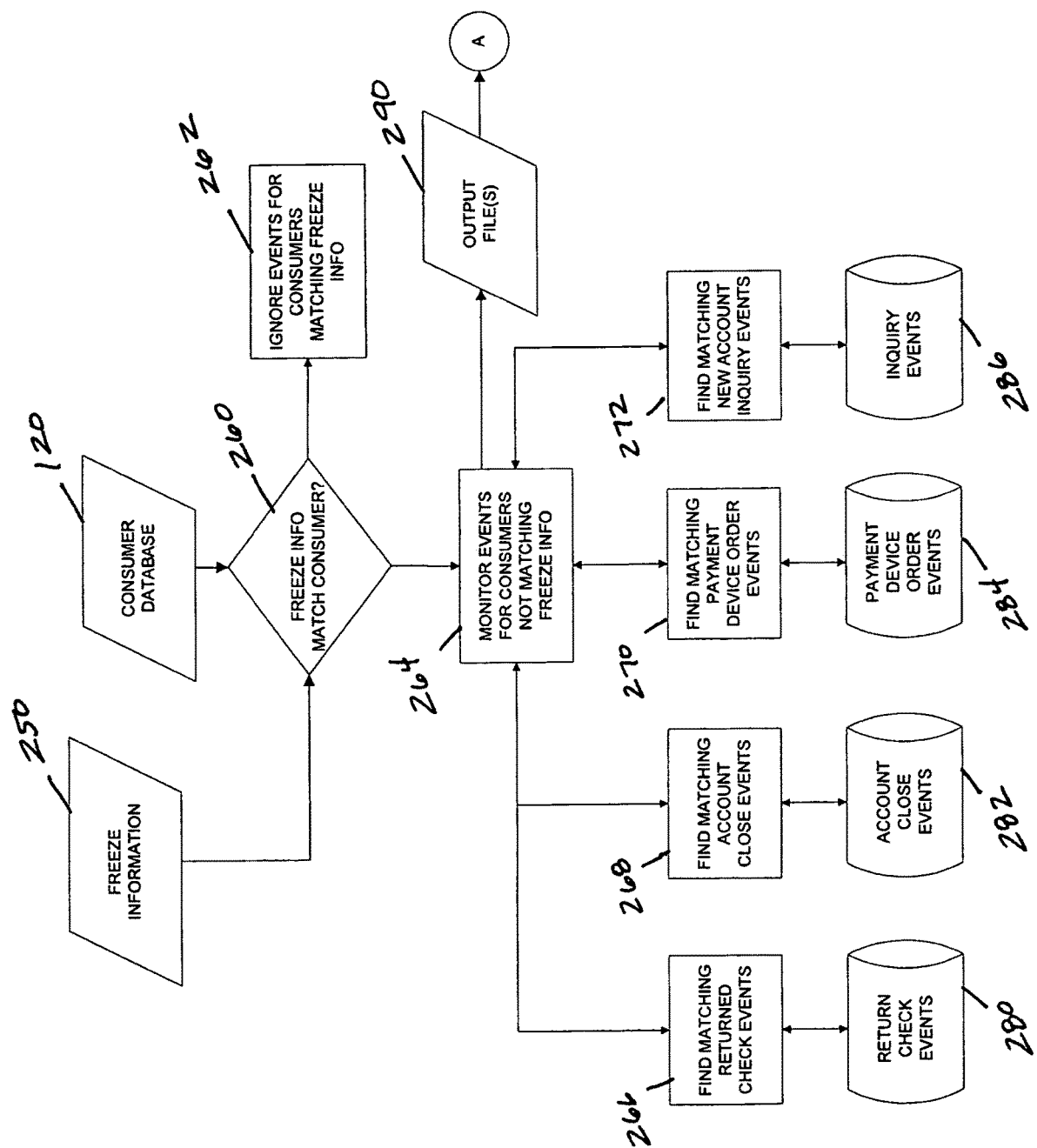
FIG. 9 illustrates a method of monitoring events with an identity theft solution system according to one embodiment of the invention.

After parsing and standardizing the events 190, the monitoring system 102 can compare the events 190 to consumers enrolled with the identity theft solution system 100. FIG. 9 illustrates a method of comparing the events 190 with enrolled consumers. As shown in FIG. 9, the monitoring system 102 can receive freeze information (step 250). The monitoring system 102 can obtain the freeze information from one or more financial institutions, one or more financial service providers, such as credit monitoring systems, and/or one or more consumers. The freeze information process (step 250) can include freezes and alerts placed on consumer account information. The monitoring system 102 can compare the freeze information with information from the consumer database 120 in order to determine if freezes or alerts are in place for any of the enrolled consumers (step 260). If a freeze or alert is placed on consumer account information, the monitoring system can include freeze or alert placement and/or freeze and alert lifting on the report or letter.

If, however, an enrolled consumer has not placed a freeze or an alert on their account information, the monitoring system 102 can monitor or identity events associated with the enrolled consumer (step 264). It should be understood that the monitoring system 102 can also attempt to identify events associated with all enrolled consumers regardless of whether or not a freeze has been put in place.

The events 190 can be categorized into event types. As described above with respect to FIG. 8, the events 190 can include voluntary and non-voluntary account closure events, new account inquire events, check or other payment device order events, returned check events, account freeze events, account freeze lift events, and/or stolen or lost account number events, which can be issued when a credit and/or debit card or other account information that could potentially be used by an identity theft is lost or stolen. In some embodiments, the events 190 can be stored and/or grouped based on their type.

For each enrolled consumer, the monitoring system 102 can query or request events assigned a key that matches the assigned key of an enrolled consumer. As shown in FIG. 9, in some embodiments, the monitoring system 102 can request specific types of events. For example, for enrolled consumers, the monitoring system 102 can request matching returned check events (step 266), matching account closure events (step 268), matching payment device order events (step 270), and matching new account inquiry events (step 272). In some embodiments, the monitoring system 102 can use one or more processes and/or threads in order to concurrently obtain each type of event.

In response to the above matching event requests, the monitoring system 102 can obtain matching returned check events 280, matching account closure events 282, matching payment device order events 284, and matching new account inquiry events 286 for each enrolled consumer, if available. In some embodiments, as shown in FIG. 8, the monitoring system 102 uses consumer preferences stored in the consumer database 120 to process the obtained matching events. For example, if a consumer specifies that he or she only wants to receive notification of returned check events, the monitoring system 102 can ignore any matching events associated with the consumer that do not include returned check events. The monitoring system 102 can also use information from the vendor database 180 to process the matching events. For example, the monitoring system 102 can use contract details stored in the vendor database 180 in order to determine whether particular events should be included in a notification for a consumer enrolled through a particular vendor.

After obtaining and processing matching events, the monitoring system 102 can generate one or more output files 290. The output files 290 can include notifications, report, and/or files. The notifications can include event notifications that list matching events screened with the monitoring system 102. The notifications can also include no-activity notifications that indicate that no matching events (or no matching events of a required type) were screened by the monitoring system 102. In some embodiments, a consumer, a vendor, and/or an account management system can specify preferences regarding whether no-activity notifications should be generated. As shown in FIG. 8, in some embodiments, the monitoring system 102 can obtain information from the vendor database 180. The monitoring system 102 can use information from the vendor database 180 to set the format or the structure for one or more output files 290. For example, the output files 190 can include specifications to particular logos, verbiage, envelopes, etc., specific to a particular vendor preference, a particular consumer preference, and/or a particular account management system preference. The monitoring system 102 can also use information from the vendor database 180 to determine pricing and billing for particular vendors, consumers, and/or account management systems. In some embodiments, the output files can also include enrollment welcome correspondence, such as the correspondence 130 described above with respect to FIG. 5.

As shown in FIG. 8, the monitoring system 102 can store events matching an enrolled consumer in the consumer database 120. The events can be stored to the event log table 120d of the consumer database 120 as described above with respect to FIG. 7. In some embodiments, the monitoring system 102 can store all matching events to the consumer database 120. The monitoring system 102 can also store just those events included in any generated notifications, reports, and/or files. The monitoring system 102 can also store events in the consumer database 120 that need to be included in future notifications, report, and/or files. Storing the matching events in the consumer database 120 can allow the monitoring system 102 to regenerate notifications, reports, and/or files, if needed, and/or generate summary notifications, reports, and/or files. In some embodiments, events stored in the consumer database 120 can be purged after a predetermined amount of time, such as 13 months. Events and/or consumer information stored in the consumer database 120 can also be purged after a consumer's enrollment expires. In some embodiments, the monitoring system 102 can be configured to generate a renewal notification in order to notify the consumer 100 before their enrollment expires. For example, the monitoring system 102 can send a renewal notification to a consumer one month before the consumer's enrollment expires. A renewal notification can be included in an output file 290 as a separate notification or as part of an event notification or a no-activity notification.

Figure 10:
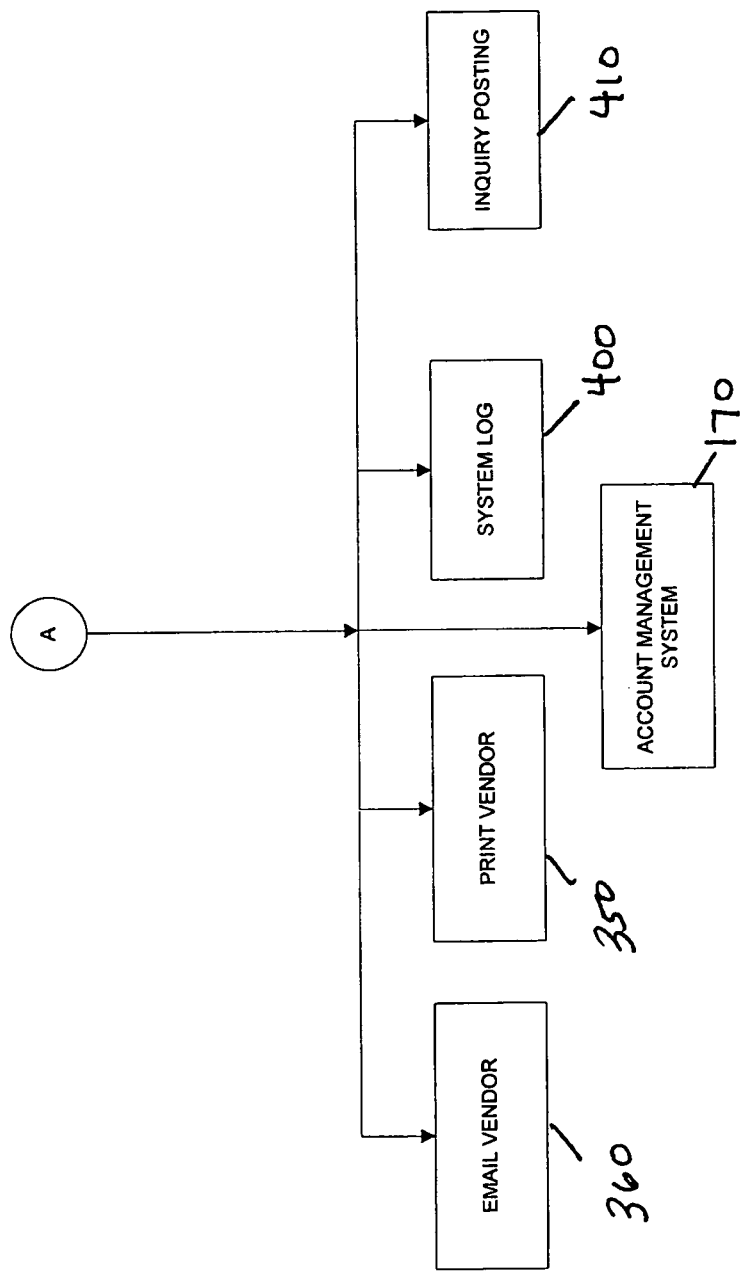
FIG. 10 illustrates a method of reporting monitored events with an identity theft solution system according to one embodiment of the invention.

As shown in FIGS. 8 and 10, after generating one or more output files 290, the monitoring system 102 sends the output files 290 to a print vendor 350, an email vendor 360, and/or one or more account management systems 170. The monitoring system 102 can transmit the output files 290 over a network, such as the Internet or a LAN. The monitoring system 102 can also transmit output files 290 via mail, telephone, and/or facsimile. In some embodiments, the monitoring system 102 uses FTP to transfer the output files 290. The monitoring system 102 can encrypt the output files 290 before transmitting the files 290 to the print vendor 350, the email vendor 360, and/or one or more account management systems 170. Table 6 (below) illustrates a file format for transmitting an output file 290 from the monitoring system 106 to the print vendor 350, the email vendor 360, and/or one or more account management systems 170 according to one embodiment of the invention.

TABLE 6

| Field Name | Format/Value List/Special Notes | Description |
| --- | --- | --- |
| Header Segment | | |
| Segment Identifier | Constant | Constant used to identify "header" segment. |
| File Identifier | Constant | Value that instructs monitoring system 106 of what business rules to apply depending on information contained in the file. |

TABLE 6-continued

| Field Name | Format/Value List/Special Notes | Description |
| --- | --- | --- |
| Vendor Identifier | — | Reporting vendor's security code. |
| File Sequence Number | Sequential numbers starting with 1, unique to information furnisher. | Number used to eliminate duplicate file processing. |
| File Create Date | Format: HHMMSS | Date the file was generated. |
| File Create Time | Format: YYYYMMDD | Time the file was generated. |
| File Version Number | Constant | Version number of the file layout. |
| Product Code | FI—FI Initiated<br>CI—Consumer Initiated | Two character code for product or service provided. |
| 3rd Party Customer Identifier | — | Third party vendor's security code. |
| Correction Code | Value:<br>N = Not a Correction file (default)<br>Y = Correction file | Code value to indicate whether the file is to be considered a correction file for a file that was previously transmitted. |
| Filler | Set to spaces. | |
| | Trailer Segment | |
| Segment Identifier | Constant | Constant used to identify "trailer" segment. |
| File Create Time | Format: HHMMSS | Time the file was generated. |
| File Create Date | Format: YYYYMMDD | Date the file was generated. |
| Total Detail Record Quantity | — | Total number of records included in the file excluding the header and trailer. |
| Filler | Set to spaces. | — |
| | Detail Segment | |
| Record Identifier | — | Unique identifier of record in this file. |
| Letter Type | Value:<br>AM = Alert Monitor<br>NM = No Activity Monitor | Encoded value that describes the letter template to be used for record. |
| Logo Identifier | — | Identifier of the logo that print vendor is to use when constructing the letter. |
| Reported Date | — | Calendar date for the day the monitoring information was reported. |
| First Name | — | First name of the consumer for which monitoring report was created. |
| Middle Name | — | Middle name of the consumer for which monitoring report was created. |
| Last Name | May contain generation notation and/or professional designation if the customer does not provide this information in discrete data elements. | Last name of the consumer for which monitoring report was created. |
| Generation Text | Examples:<br>Jr<br>Sr<br>I<br>II<br>III<br>IV | Information used to further distinguish one consumer from another. This information is usually found in the trailing information of one's name and indicates a relationship to parentage. |
| Address Line 1 Text | Examples:<br>Street Address - 123 S Main St NW Apt 12B<br>PO Box - PO Box 44<br>Rural Route - Rt 29, Box 1B | Mailing address for the consumer named in record. |
| Address Line 2 Text | — | Second line of the mailing address. |
| City Name | — | City name for the mailing address of the consumer. |
| Province/State Code | — | Standard postal service state abbreviation for the mailing address of the consumer. |
| Postal Code | Format:<br>US: 99999 or 999999999<br>Canada: ANA ANA<br>Mexico: 99999 | Postal code (ZIP code) for the mailing address of the consumer. |
| Country Code | — | Encoded value describing country for the mailing address of the consumer. |
| Contact Email Address | Must be present if Notification Media Code is 'E'. | Consumer's email address that may be used to deliver monitoring notifications. |
| Notification Media Code | Value:<br>E = Email<br>L = Letter | Encoded value indicating the consumer's preference of media for receiving monitoring notifications. |
| Monitoring Result 1 Text | — | Textual comment 1 on what the monitoring service reported. |
| Monitoring Result 2 Text | — | Textual comment 2 on what the monitoring service reported. |

TABLE 6-continued

| Field Name | Format/Value List/Special Notes | Description |
| --- | --- | --- |
| Monitoring Result 3 Text | — | Textual comment 3 on what the monitoring service reported. |
| Monitoring Result 4 Text | — | Textual comment 4 on what the monitoring service reported. |
| Monitoring Result 5 Text | — | Textual comment 5 on what the monitoring service reported. |
| Monitoring Result 6 Text | — | Textual comment 6 on what the monitoring service reported. |
| Monitoring Result 7 Text | — | Textual comment 7 on what the monitoring service reported. |
| Monitoring Result 8 Text | — | Textual comment 8 on what the monitoring service reported. |
| Monitoring Result 9 Text | — | Textual comment 9 on what the monitoring service reported. |
| Monitoring Result 10 Text | — | Textual comment 10 on what the monitoring service reported. |

The output files 290 including notifications, reports, files, welcome correspondence, etc. for individual consumers can be transmitted separately or as a batch file. For example, the file format shown above in Table 7 includes multiple detail segments between a single header segment and trailer segment. Each detail segment can include a notification and/or a report for a particular consumer.

The print vendor 350, the email vendor 360, and/or one or more account management systems 170 can use the output files 290 to generate correspondence, such as notifications, welcome correspondence, reports, etc., in the form of letters or emails. In some embodiments, the print vendor 350 and the email vendor 250 can generate correspondence that includes vendor customizations, such as a logo of a financial institution. The print vendor 350 can also generate one or more envelopes that include vendor customizations. In some embodiments, the monitoring system 102 can provide logo files, such as digitized-ready, Joint Photographic Experts Group ("jpeg") files, or other types of image files, to the print vendor 350 and/or the email vendor 360 either included in output files 290 or separately, which the print vendor 350 and/or the email vendor 360 can use to customize correspondence. A vendor can also directly provide vendor customizations to the print vendor 350 and/or the email vendor 360.

Figure 11A:
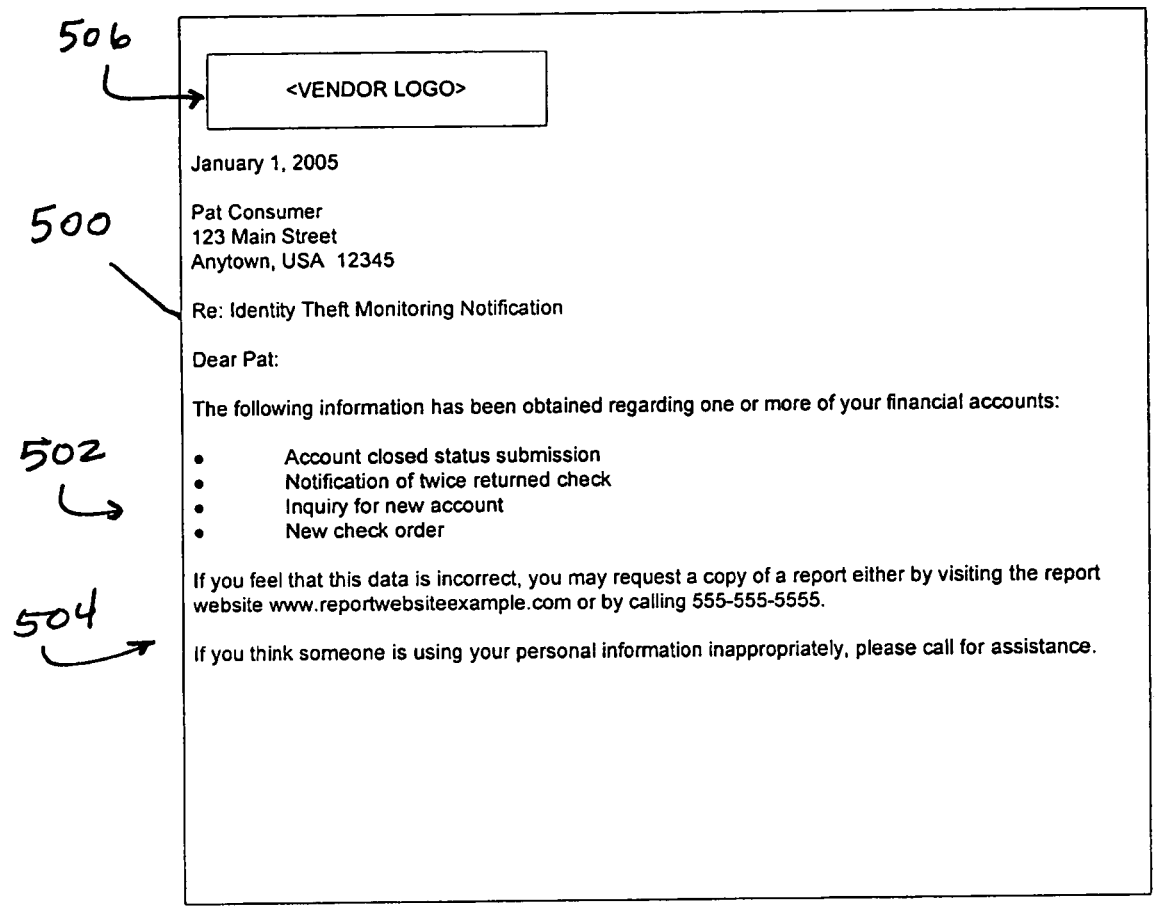
FIGS. 11A-11C illustrate event notifications according to one embodiment of the invention.
Figure 11B:
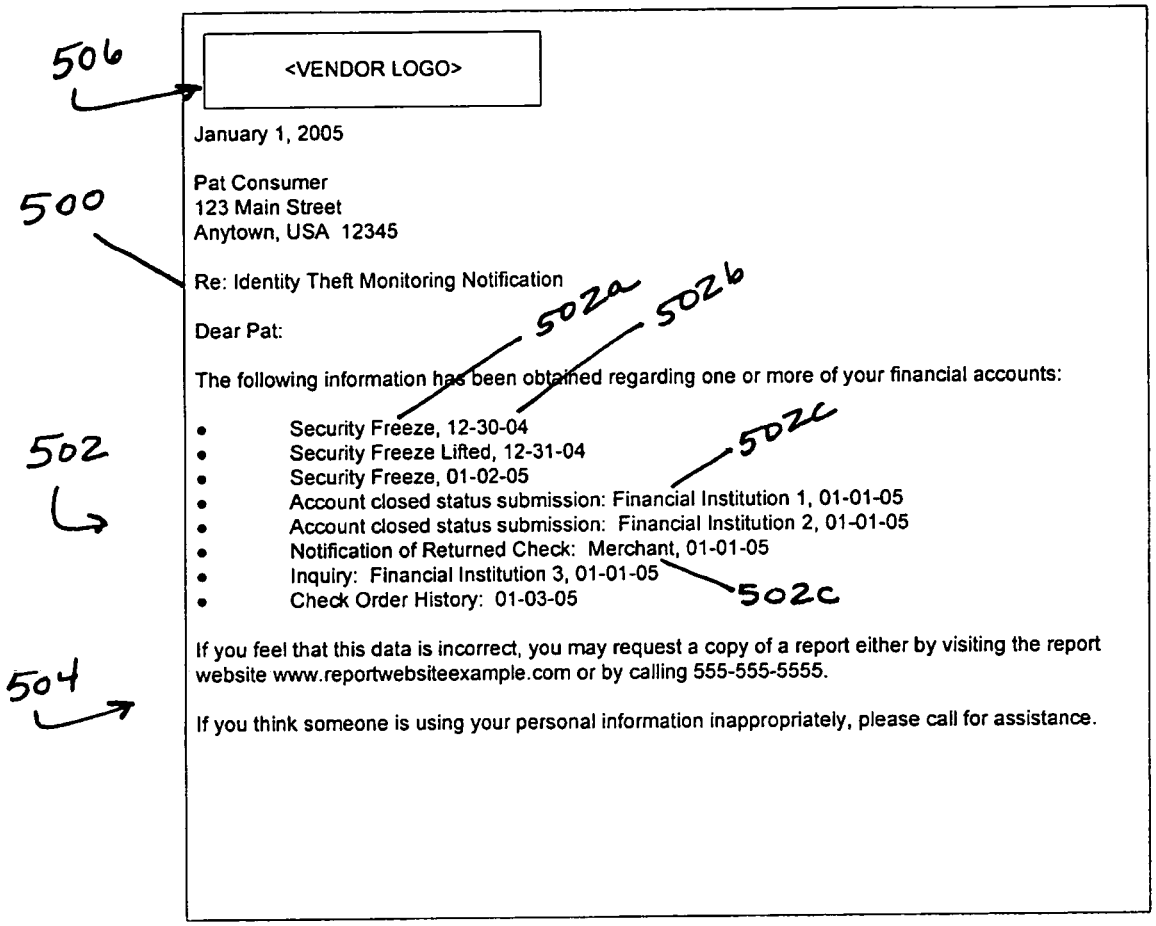
Figure 11C:
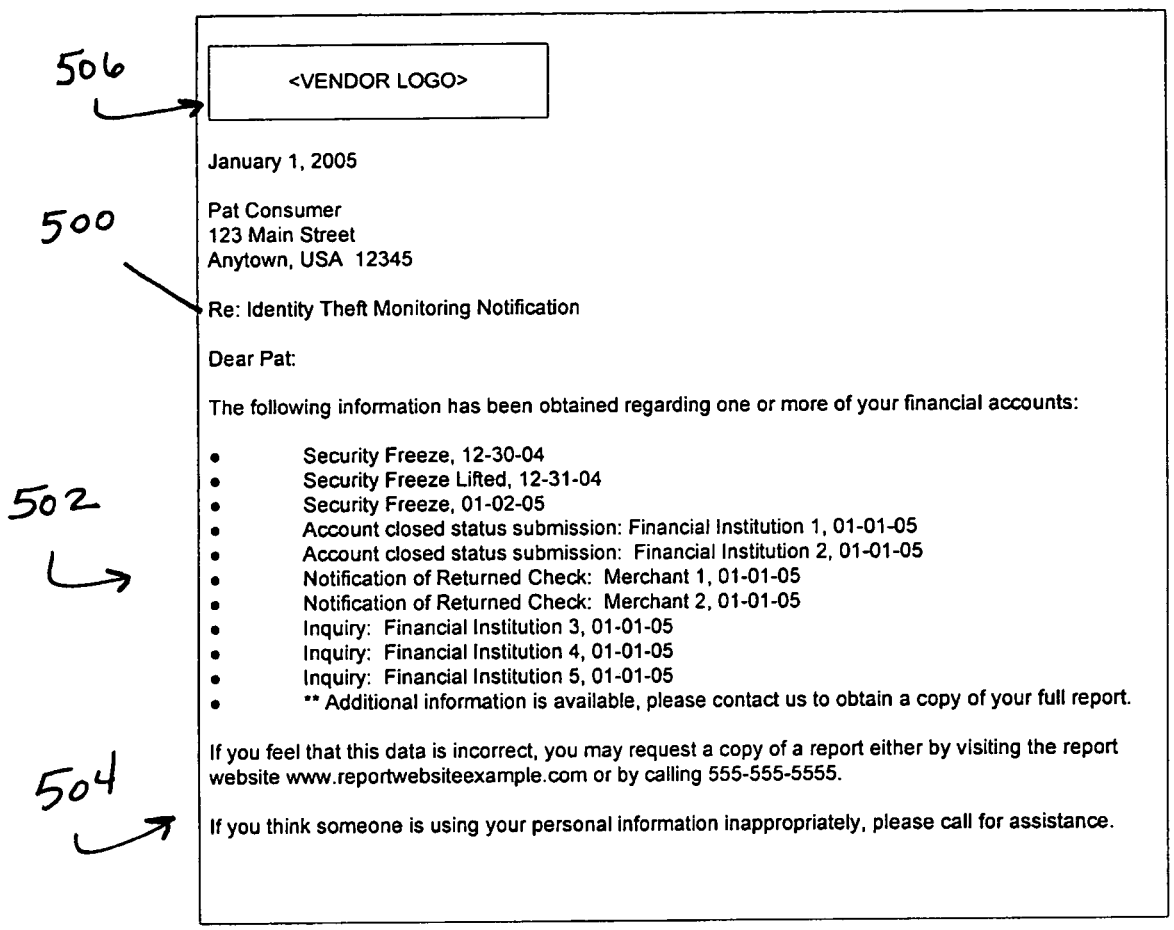

The correspondence can include one or more notifications 500, such as those illustrated in FIGS. 11A-11C. In some embodiments, a notification 500 can include an event notification, which lists one or more events screened with the monitoring system, a no-activity notification, which indicates that no events were screened with the monitoring system for the consumer, and/or a renewal notification, which indicates a pending expiration of the consumer's enrollment with the identity theft solution system. An event notification can include an event listing 502. The event listing 502 can include events screened with the monitoring system 102 that are associated with or match the consumer receiving the notification 500. Each listed event can include an event type 502a, an event date 502b, and/or an event source 502c, such as a financial institution that generated a new account inquiry event or a merchant that generated a returned check event, as shown in FIG. 11B. In some embodiments, an event notification 500 may not be structured to list all the events matching a particular consumer, and, as shown in FIG. 11C, the event listing 502 may indicate that additional matching events were identified. The event listing 502 may also indicate how the consumer can obtain the additional matching events. In some embodiments, the event listing 502 can specify that a freeze has been placed on a consumer's financial information.

An event notification can include an instruction section 504. The instruction section 504 can include instructions and/or actions for a consumer to take if they have questions or concerns regarding the events listed in the event listing 502. For example, the instruction section 504 can include contact information, such as contact information for a financial institution or an identity theft management system 100, which specifies who a consumer should contact if they have questions regarding the listed events or if they think someone is using their account information inappropriately. The contact information can also specify how a consumer can receive a report summarizing the status and/or history of the consumer's account information. In some embodiments, the contact information can list an address, an email address, a phone number, a website address, etc., of a financial institution or an identity theft management system where a consumer can post questions, comments, disagreement notifications and/or receive reports, additional information, and notifications.

A notification 500 can include a no-activity notification. A no-activity notification can specify that no matching event (or no matching event of one or more requested types) where obtained and screened with the monitoring system 102. In some embodiments, a consumer, a vendor, and/or an account management system 170 can specify whether no-activity notifications should be generated. The absence of an event notification can also indicate no matching events were obtained.

In some embodiments, a notification can include a renewal notification that indicates a pending expiration of the consumer's enrollment with the identity theft solution system 100. For example, the monitoring system 102 can generate an output file 290 that specifies those consumer's whose enrollment will expire in one month, and the print vendor 350 and/or email vendor 360 that receives the output file 290 can generate renewal notifications for the consumers. In some embodiments, a renewal notification can be included in an event notification or a no-activity notification.

A consumer can enroll with the identity theft solution system 100 through one or more vendors. A consumer can also enroll with the identity theft solution system 100 directly. In both cases, the monitoring system 102 can generate output files that allow correspondence to be generated for the consumer for each enrollment initiated by the consumer. For example, if a consumer enrolls with the identity theft solution system 100 through multiple vendors, the monitoring system can generate output files 290 that cause correspondence to be generated and sent to the consumer on behalf of each vendor. In some embodiments, correspondence from each vendor can include identical event information. Correspondence from each vendor can also be individually customized. If a consumer enrolls with the identity theft solution system 100 through multiple sources, the monitoring system can also combine any correspondence for the consumer.

As shown in FIGS. 11A-11C, notifications 500 can include vendor customizations 502, such as a vendor logo, a vendor trademark, specific verbiage, specific contact information included in the instruction section, specific envelopes, specific paper, specific font, etc. As described above, the identity theft solution system 100 can provide vendor customizations to the print vendor 350 and/or the email vendor 360 either in the output files 290 or separately. A vendor can also directly provide customizations to the print vendor 350 and/or the email vendor.

As described above with respect to FIGS. 1 and 2, upon receiving the notifications, the consumer 100 can transmit one or more disagreement notifications to the monitoring system 102 if the consumer 110 disagrees with the notification. In some embodiments, the consumer 110 can route disagreement notifications to the vendor 112, and the vendor 112 can forward the disagreement notifications to the monitoring system 102. The consumer 110 can use information included in the instruction section 504 to generate and transmit a disagreement notification.

The monitoring system 102 can route the disagreement notifications from the consumer 110 to one or more event providers 103, which can notify an event provider 103 and initiate a verification process. The verification process can include obtaining additional information regarding a particular event, stalling an event, declining an event, etc.

In some embodiments, the one or more account management systems 170 can use output files 290 transmitted from the monitoring system 102 to monitor credit and/or debit information for clients of a financial institution. For example, a financial institution can request credit-related monitoring and/or debit-related monitoring for each client that holds an account with the financial institution. The account management system 170 can interact with the monitoring system 102 in order to monitor account information related to the clients of the financial institution. In some embodiments, the financial institution can use information provided from the monitoring system 102 to determine financial risk of a client. For example, if a non-voluntary account closure event has been generated for a client of the financial institution on an account held by the client through another financial institution, the financial institution can use the knowledge of the non-voluntary closure events to determine an amount of credit to provide to the client, the amount of returned checks to accepts, penalty amounts for returned checks, and other preferences for the client.

The event knowledge provided from the monitoring system 102 can also be used for cross-selling information. For example, if a first financial institution discovers that a client who holds one account with the financial institution holds one or more additional accounts with other financial institutions, the first financial institution can attempt to persuade the client to transfer their additional accounts. The information provided from the monitoring system 102 can also be provided to clients of a financial institution, similar to how the print vendor 350 and/or the email vendor 360 provide information to consumers. For example, a financial institution associated with one of the one or more account management systems 170 can provide notifications 500 to their clients, as described above with respect to FIGS. 11A-11C. The notifications 500 can be provided separately or as part of regular correspondence between the financial institution and the client, such as a monthly account report.

As shown in FIG. 10, the monitoring system 102 can also transmit output files 290 to a system log 400. As described with respect to FIG. 12, the system log 400 can be used to generate vendor reports. The vendor report can include information such as a number of events screened for a consumer enrolled through a particular vendor.

The monitoring system 102 can also use output files 290 for inquiry posting 410. The monitoring system 102 can record the information transmitted to the print vendor 350, the email vendor 360, one or more account management systems 170, and/or the system log 400 in order to comply with the FCRA.

As shown in FIG. 8, the monitoring system 102 can also perform billing processes. In some embodiments, the monitoring system 102 bills the vendor 112 for events screened for each consumer 110 enrolled through the vendor 112. Billing specifications and preferences for a particular vendor can be stored in the vendor database 180. Billing can also depend on the types of notifications and reports generated for consumer enrolled through a particular vendor. For example, if all consumers enrolled through a particular vendor request daily notifications including no-activity notifications, the vendor can be billed more than if all consumers enrolled through the vendor requested only monthly notifications. The monitoring system 102 can also generate bills for financial institutions whose account management systems 170 receive output files 290.

Individual consumers can also be billed for screening performed by the monitoring system 102. In some embodiments, a consumer can specify billing specifications and preferences in their consumer information provided during or after enrollment.

Figure 12:
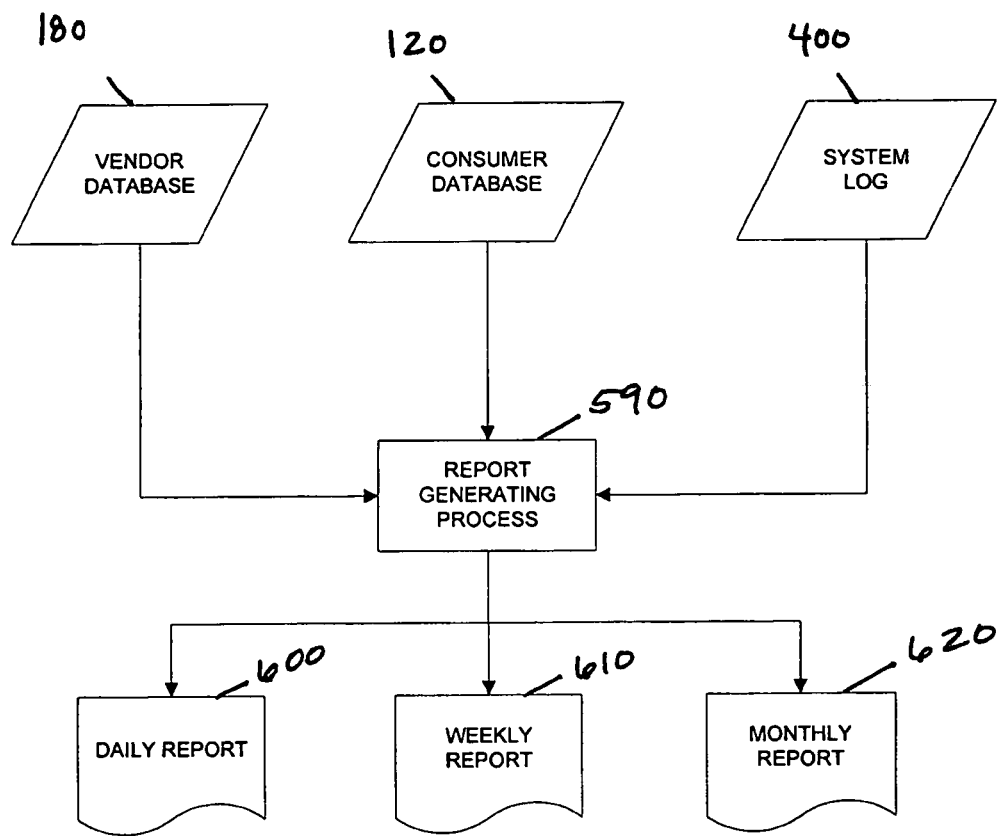
FIG. 12 illustrates a method of a generating vendor reports with an identity theft solution system according to one embodiment of the invention.

In some embodiments, the monitoring system 102 provides vendor reporting. FIG. 12 illustrates a report generating process 590, according to one embodiment of the invention. As shown in FIG. 12, the monitoring system 102 can generate a daily report 600, a weekly report 610, and/or a monthly report 620. The monitoring system 102 can also be configured to generate other types of reports. The monitoring system 102 uses information from the vendor database 180, the consumer database 120, and/or the system log 400 to generate vendor reports. In some embodiments, the monitoring system 102 uses information from the vendor database 180 to format or structure one or more vendor reports. The monitoring system 102 can also use information from the vendor database 180 to determine one or more types of reports to generate for a particular vendor. For example, a vendor may specify that they require both weekly reports and monthly reports. A vendor may also specify that they only require daily reports if particular situations exists, such as if a number of generated notifications exceeds a predetermined threshold. Other processing requirements can also be stored in the vendor database 180, such as a required processing speed and/or types of events included in notifications. The monitoring system 102 can use this information to provide summaries and statistics as to what processing was performed on behalf of a particular vendor. For example, a vendor report can indicate a number of consumers who enrolled during a particular time frame, a total number consumers who have enrolled, a number of and/or types of events screened per consumer or for all consumers, a number of notifications, correspondence, report, files, etc. generated, and/or other quantity and quality metrics. Billing and pricing information can also be obtained from the vendor database 180 and included in a vendor report.

The monitoring system 102 can use information from the consumer database 120 in a vendor report to indicate which consumers are enrolled through a particular vendor. The monitoring system 102 can also use events stored to the consumer database 120 to indicate monitored events for consumers enrolled through a particular vendor.

In some embodiments, the monitoring system 102 can use information from the system log 400 to specify processing statistics in a vendor report. For example, a vendor report can include a number of events processed and an associated processing time. A vendor report can also include any errors occurring during the processing of events, which can be logged in the system log 400. In some embodiments, vendor reports can compare processing statistics obtained from the system log 400 to processing requirements set by a vendor and stored in the vendor database 180.

The monitoring system 102 can also generated similar reports for account management systems 170, individual consumers, event providers 103, and/or for internal purposes.

Figure 13:
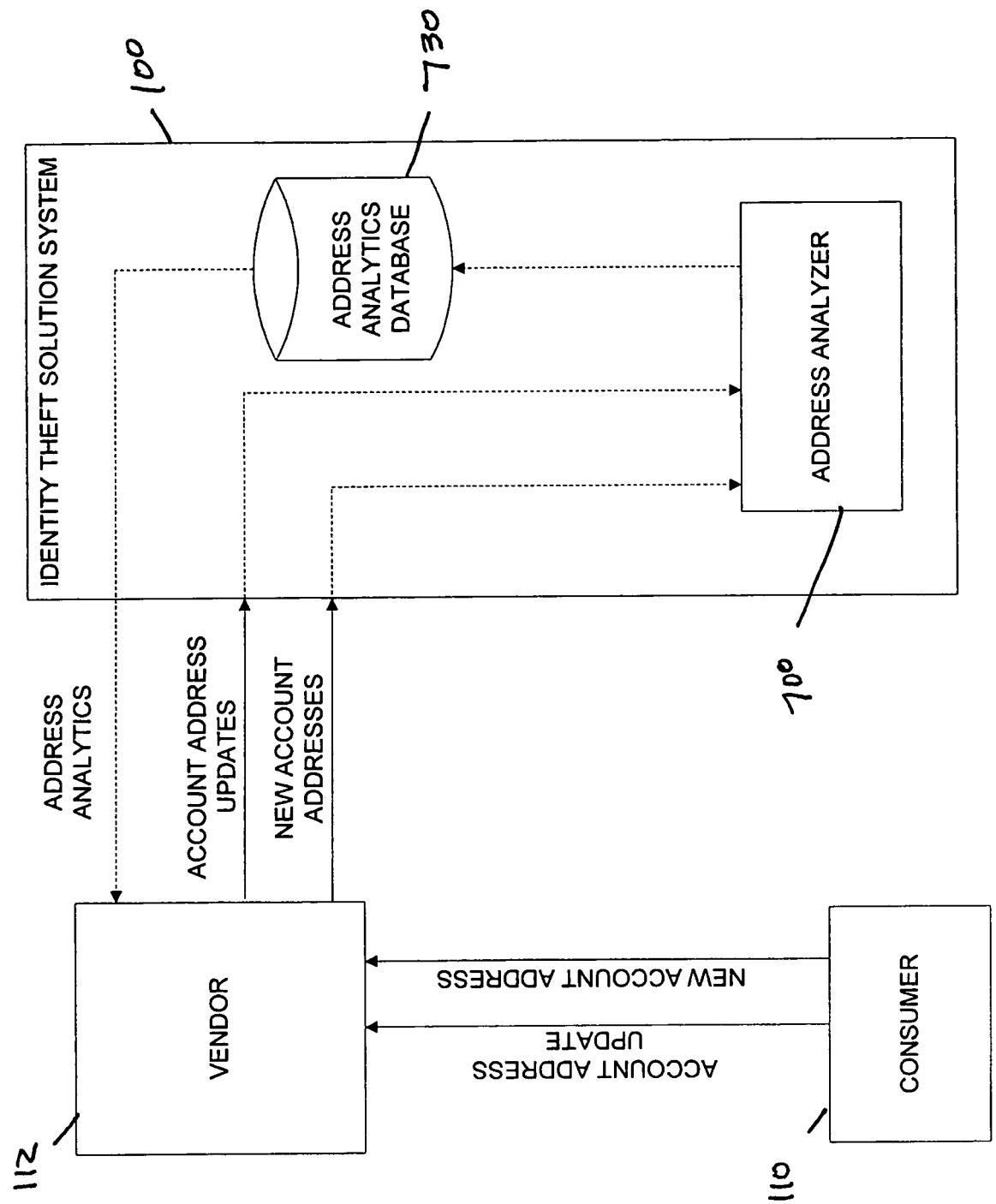
FIG. 13 illustrates an identity theft solution system including an address analyzer according to one embodiment of the invention.

In some embodiments, the identity theft solution system 100 can include additional systems and/or functionality. For example, as shown in FIG. 13, the identity theft solution system 100 can include an address analyzer 700. The address analyzer 700 can predict the likelihood of identity theft based on anomalies in address related information. In some embodiments, the address analyzer 700 includes an Address Differential Analysi$^{SM}$ ("ADA") System created by ID Insight$^{SM}$ Incorporated. In some embodiments, when a thief attempts to open a new account in a victim's name and/or take over an existing account of the victim, the thief provides an address that is different from that of the victim. If the thief were to provide the same address of the victim, all correspondence, such as new credit cards, checks, etc., would be sent to the victim's home and would not be accessible to the identity thief. The victim would also receive reports and bills generated for the stolen accounts and could freeze the accounts and attempt to stop the identity theft quicker than if the victim were unaware of the stolen identity. Therefore, the address analyzer 700 examines address modifications, which can include new account addresses and existing account address changes, and attempts to identity address changes that are legitimate and those that are likely to be fraudulent. In some embodiments, the address analyzer 700 screen address modifications against one or more databases that include demographic information, government information, and fraud-related address information in order to identify address changes that are out of the normal address change patterns. The address analyzer 700 can assign a score to an address modification that indicates a likelihood that an identity theft is in progress. The address analyzer 700 can also provide supporting investigative information.

As shown in FIG. 13, the consumer 110 can provide address modifications that include new account addresses and/or account address updates. In some embodiments, the consumer 110 can provide account modifications to the vendor 112, and the vendor 112 can forward the address modifications to the identity theft solution system 100. The consumer 110 can also directly provide address modifications to the identity theft solution system 100 without using the vendor 112. In some embodiments, the identity theft solution system 100 includes a consumer interface, such as a website, where the consumer 110 can provide address modifications. Address modifications provided to the consumer interface can be transmitted to the identity theft management system 100 over a network, such as the Internet or a LAN. Address modifications can also be transmitted via mail, telephone, and/or facsimile. In some embodiments, the address modifications are encrypted before being transmitted in order to increase the secrecy and security of the address modifications.

Upon receiving address modifications, the vendor 112 can transmit the address modifications to the identity theft solution system 100. The vendor 112 can transmit the address modifications to the identity theft solution system 100 over a network, such as the Internet or a LAN. The vendor 112 can also transmit the address modification via mail, telephone, and/or facsimile. In some embodiments, the vendor 112 can encrypt the address modifications before transmitting the address modifications.

The identity theft management system 100 receives the address modifications from the vendor 112 and/or directly from the consumer 110, and provides the address modifications to the address analyzer 700.

In some embodiments, the identity theft management system 100 can process the address modifications before providing them to the address analyzer 700. For example, the identity theft management system 100 can include an identity verification system 710 (FIG. 15), such as Fast-Watch provided by Penley. The identity verification system 710 can screen address modifications against a broad database of consumer information in order to determine potentially fraudulent information or fraudulent uses of information. In some embodiments, the identity verification system 710 obtains associated consumer information, such as consumer information stored in the consumer database 120, in order to verify that a consumer initiating an address modification is enrolled with the identity theft solution system. The identity verification system 710 can also obtain associated consumer information in order to verify a consumer initiating an address modification. For example, a consumer may be required to provide predetermined consumer-specific information, such as an account number, a social security number, a driver's license number, a previous address, etc. The identity verification system 710 can compare the consumer-specific information to consumer information stored in the identity theft solution system 100 (or an external system) in order to verify the consumer.

In some embodiments, the identity verification system 710 assesses one or more information networks 720 (FIG. 15), such as the CrimeDex Network$^{SM}$ operated by the American Criminal Investigators Network$^{SM}$ ("AMCRIN") Corporation. The information networks 720 can provide assess to identity theft criminal information shared between financial institutions, merchants, utilities, and law enforcement. In some embodiments, the information networks 720 provide assess to fraudulent check databases, warm address information, fraud suspect databases, and/or fraud alert databases, which include local, regional, and national alerts on credit card fraud, check fraud, and bank robberies. The one or more information networks 720 can also provide identity theft investigative services and identity theft case management. In some embodiments, the identity verification system 710 uses the one or more information networks 720 to verify a consumer providing an address modification. The identity verification system 710 can also upload identity theft related information to the information networks 720.

In some embodiments, as described in further detail below with respect to FIG. 14, the identity verification system 710 and/or the address analyzer 700 can perform address mismatch screening. An address mismatch can occur when an address modification causes an address to differ from other addresses associated with a consumer. For example, if a consumer holds three accounts with three different financial institutions and attempts to change the address associated with one of the accounts, the changed address can be different from the addresses for the other accounts and, therefore, can be considered an address mismatch. An address mismatch identified by the identity verification system 710 and/or the address analyzer 700 can indicate a high likelihood of fraudulent behavior and can require additional screening.

After verifying the consumer 110, the identity verification system 710 can transmit the address modifications to the address analyzer 700. In some embodiments, address modifications can be transmitted to the address analyzer 700 over a network, such as the Internet or a LAN. The network can include a secure connection, such as a secure socket layer ("SSL") connection.

In some embodiments, address modifications can be transmitted to the address analyzer 700 with a particular format, for example with an extensible mark-up language ("XML"). The address analyzer 700 can process the address modifications, and can return address analytics to the identity theft management system 100 (or the identity verification system 710). As described above, the address analytics can include a score that indicates likelihood that an address modification is involved in identity theft. The address analytics can also include supporting investigative information. In some embodiments, address analytics can be stored in an address analytics database 730. Address analytics stored in the address analytics database 730 can be used in address analytics reports provided to the consumer 110 and/or the vendor 112. For example, the vendor 112 can request all address modifications and related address analytics for a specific consumer 110.

As shown in FIG. 13, the address analytics can be provided to the vendor 112 that requested the address modification screening. In some embodiments, the vendor 112 can forward the address analytics to the consumer 110 initiating the address modification. The vendor 112 can also retain the address analytics internal and can use the address analytics to accept or deny an address modification submitted by the consumer 110. In some embodiments, depending on the returned address analytics, the vendor 112 can request additional supporting documentation from the consumer 110 before changing and/or setting the address of the consumer 110.

As described above, the consumer 110 can directly submit address modifications to the identity theft solution system 100 without using the vendor 112. As shown in FIG. 14, when the consumer 110 directly submits address modification to the identity theft solution system 100, the identity theft solution system 100 can return address analytics to the consumer 110. In some embodiments, the consumer 110 can provide address modifications to the identity theft solution system via a consumer interface (e.g., a website) and returned address analytics can be displayed to the consumer 110 via the same consumer interface. In some embodiments, the address analytics are displayed in a hyper-text mark-up language ("HTML") on the consumer interface. The address analytics can be displayed in real-time. In some embodiments, the address analytics can also be transmitted to the consumer 110 via mail, email, telephone, and/or facsimile.

Figure 14:
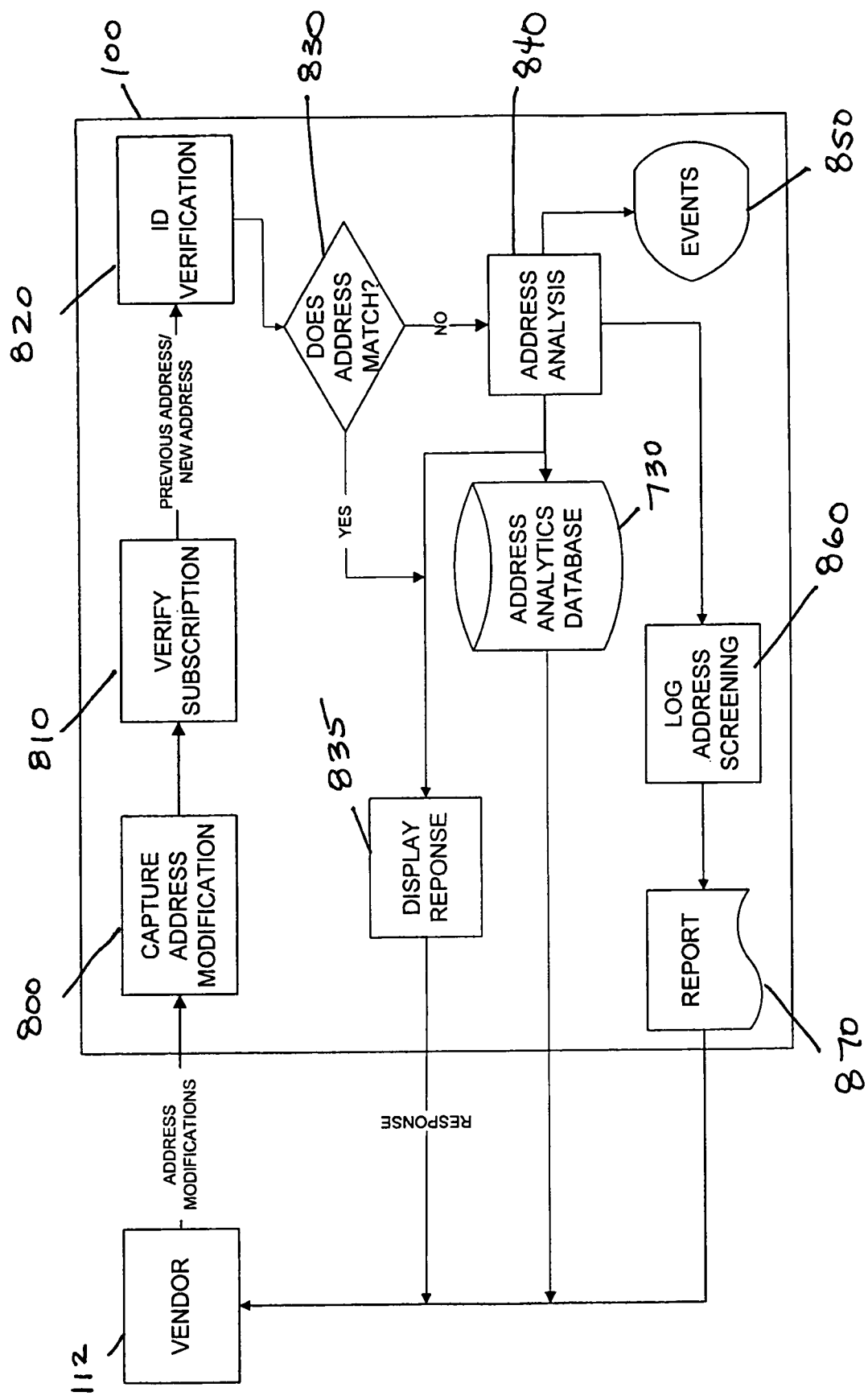
FIG. 14 illustrates a method of analyzing an address using the identity theft solution system of FIG. 13.

FIG. 14 illustrates a method of performing address screening on an address modification according to one embodiment of the invention. As shown in FIG. 14, the vendor 112 submits an address modification screening request to the identity theft solution system 100. The address modification screening request includes an address modification, such as an address for a new account or an updated address for an existing account. As described above with respect to FIG. 13, the consumer 110 can also directly submit an address modification screening request to the identity theft solution system 100.

The identity theft solution system 100 captures the request (step 800) and can verify that the vendor 112 (and/or the consumer 110 associated with the address modification) is authorized with the identity theft solution system 100 (step 810). In some embodiments, only authorized vendors and/or enrolled consumers can submit address modification screening requests. The identity theft solution system 100 can use one or more databases, such as the consumer database 120 and/or the vendor database 180, to verify the ability of the identity theft solution system 100 to service the address modification screening request.

If the requested address modification screening is verified, the identity theft solution can obtain a previous address of a consumer. In some embodiments, a previous address is included in the address modification screening request. The identity theft solution system 100 can also obtain a previous address from one or more databases, such as the consumer database 120. The previous address and the new address specified in the address modification screening request can be provided to the identity verification system 710. The identity verification system 710 can verify the information included in the address modification screening request and/or the additional information obtained by the identity verification system 710 (step 820). As part of a verification process, the identity verification system can determine whether an address mismatch would occur if the address modification were executed (step 830).

Figure 15:
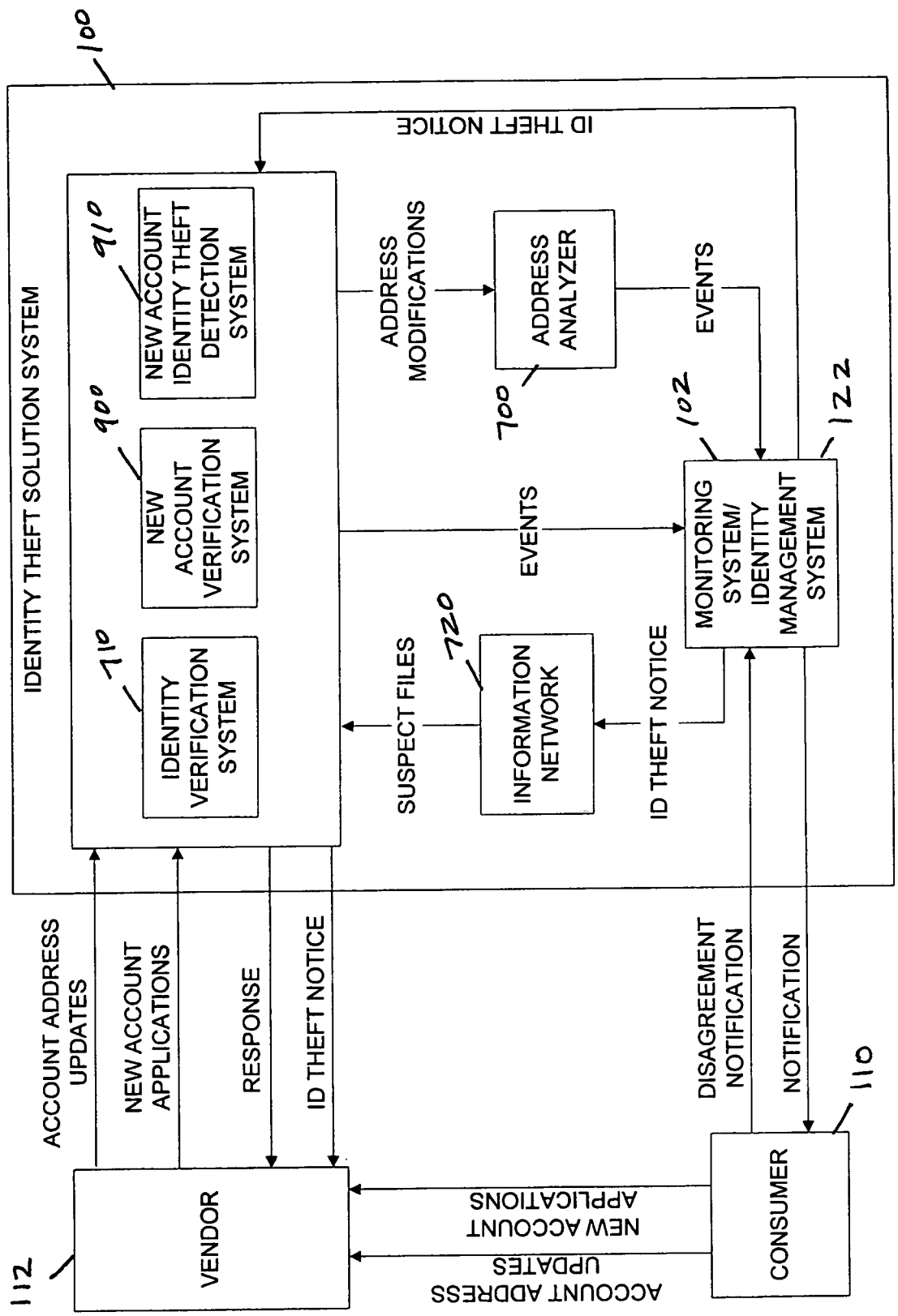
FIG. 15 illustrates another identity theft solution system according to one embodiment of the invention.

In some embodiments, as shown in FIGS. 14 and 15, if an address mismatch would not occur, the identity verification system 710 can generate a response to the vendor 112 (output 835). The response can indicate a likelihood of the address modification resulting in an identity theft attempt. The response can also indicate that the execution of the address modification does not result in an address mismatch.

If the identity verification system 710 determines that the execution of the address modification would result in an address mismatch, the identity verification system 710 can transmit the address modification (and any additional information obtained by the identity theft solution system 100 or the identity verification system 710) to the address analyzer 700 (as shown in FIG. 15). In some embodiments, the identity verification system 710 can transmit the address modification to the address analyzer 700 regardless of whether the execution of the address modification would result in an address mismatch. The vendor 112 (or the consumer 110) can specify preferences for when address modifications should be transmitted to the address analyzer 700. For example, the vendor 112 or the consumer 110 can specify that address modifications never be transmitted to the address analyzer 700, always be submitted to the address analyzer 700, or transmitted to the address analyzer 700 if specific circumstances exist, such as if an address mismatch is identified.

Upon receiving the address modification, the address analyzer 700 can perform address analysis as described above with respect to FIG. 13 (step 840 of FIG. 14). In some embodiments, the address analyzer 700 can generate one or more events (output 850), as described above with respect to FIGS. 1-12. The events can be obtained by the monitoring system 102, and the monitoring system 102 can place the events in a notification for the consumer 110. Upon receiving the notification, the consumer 110 is informed that an address modification has been submitted, and the consumer 110 can take action if he or she did not initiate the address modification.

The address analyzer 700 generates address analytics, which can be stored to the address analytics database 730. The address analytics, or a portion thereof, can also be included in a response to the vendor 112 (or the consumer 110) that submitted the address modification screening request (output 835). The response can also include information obtained by the identity theft solution 100 and/or the identity verification system 710.

In some embodiments, the address analyzer 700 can also log or track the address screening if performs (step 860). The address analyzer 700 can store the address modifications and/or the related address analytics to a log file, such as the system log 400. The log file can be used to monitor the performance of the address analyzer 700 and address any errors or inefficiencies.

As shown in FIG. 14, the vendor 112 (or the consumer 110) can obtain address analytics from the address analytics database 730. The vendor 112 (or the consumer 110) can also obtain one or more reports (output 870) based on the logging or tracking of the address screening performed by the address analyzer 700. For example, the vendor 112 (or the consumer 110) can use the logged information to determine a volume of address modifications submitted. In some embodiments, the identity theft solution system 100 uses the logged address screening information to bill the vendor 112 (or the consumer 110) for address screening. The identity theft solution system 100 can also use additional information to bill the vendor 112 (or the consumer 110), such as the consumer database 120, the vendor database 180, and/or the address analytics database 730.

In some embodiments, as shown in FIG. 15, the identity theft solution system 100 can include additional systems and functionality in order to provide services for combating identity theft at each aspect of an identity theft lifecycle. For example, the identity theft solution system 100 can include the monitoring system 102, the identity verification system 710, a new account verification system 900, a new account identity theft detection system 910, the address analyzer 700, one or more information networks 720, and the identity management system 122.

As seen in FIG. 15, the consumer 110 transmits new account applications requesting the opening of an account to the vendor 112. The vendor 112 transmits new account applications to the identity theft solution system 100. The consumer 110 can also directly transmit new account application to the identity theft solution system 100.

In some embodiments, the identity verification system 710 can process new account applications submitted by the vendor 112 on behalf of the consumer 110. As described above with respect to FIGS. 13 and 14, the identity verification system 710 can verify the identity of the consumer 110 requesting the opening of the account. The identity verification system 710 can assess one or more information networks 720, such as the CrimeDex Network[SM] operated by the AMCRINS[SM] Corporation. In some embodiments, the identity verification system 710 can obtain suspect files from the one or more information networks 720. The suspect files can provide information related to known identity thieves and/or suspected identity thieves. For example, the suspect files can include names, aliases, addresses, telephone numbers, account numbers, dollar amounts, and other data to pinpoint common elements among various fraud cases. Using the suspect files and other information, the identity verification system 710 can attempt to verify the true identity of the consumer 110 requesting the opening of an account. The identity verification system 710 can also determine if an address included in the new account opening application would cause an address mismatch.

In some embodiments, the identity verification system 710 can transmit a response to the vendor 112. The response can include the results of verifying the consumer 110 requesting the new account opening. The vendor 112 can use the response to determine whether or not the consumer 110 should be allowed to open an account.

As described above with respect to FIGS. 13 and 14, the address analyzer 700 can analyze addresses included in new account application. The address analyzer 700 can determine address analytics for an address included in a new account application. The address analytics can be returned to the vendor 112 in a response.

In some embodiments, the new account verification system 900 can process new account applications. The new account verification system 900, such as ChexSystems[SM] provided by eFunds™ Corporation, can screen new account opening requests against mishandled account information contributed from one or more financial institutions in order to determine a financial risk associated with accepting the new account application. In some embodiments, the new account verification system 900 can score a new account application that specifies the financial risk involved with accepting a specific new account application based on the contributed account information. In some embodiments, the results of screening the new account application with the new account verification system 900 can be returned to the vendor 112 in a response. The vendor 112 can use the score to determine whether or not to accept a new account application. If the vendor 112 allows the consumer 110 to open an account, the vendor 112 can also use the score to determine settings for the account. For example, the vendor 112 can set a credit limit on an account based on the score received from the new account verification system 900.

The new account identity theft detection system 910, such as FraudFinder[SM] provided by eFunds™ Corporation, can provide identity theft scoring or alerts related to a new account application. For example, the new account identity theft detection system 910 can identify information or uses of information with the greatest likelihood to be fraudulent. Likely fraudulent information can be scored, and the higher the score, the greater the likelihood of fraud. In some embodiments, scored potential fraudulent information can be prioritized and organized so that the highest risks can be reviewed and handled first. In some embodiments, the new account identity theft detection system 910 can assess the one or more information networks 720, such as the CrimeDex Network[SM] operated by the AMCRIN[SM] Corporation, and can use information, such as suspect files, to identify and score potentially fraudulent information in a new account opening request. Results of screening new account applications for identity theft with the new account identity theft detection system 910 can be provided to the vendor 112 in a response. The vendor 112 can use the response to determine whether to allow the consumer 110 to open an account.

In some embodiments, individual responses can be provided to the vendor 112 from one or more of the systems included in the identity theft solution system 100 as shown in FIG. 15. Responses from one or more of the systems can also be combined and provided as a single response.

In some embodiments, the identity verification system 710, the address analyzer 700, the new account verification system 900, and/or the new account identity theft detection system 910 can generate one or more events 190, as described above with respect to FIGS. 1-12. For example, each of the above systems can generate a new account inquiry event that indicates that a new account application is being screened. The vendor 112 can also generate a new account inquiry event, which can be transmitted to the identity theft solution system 100.

The events 190 can be received by the monitoring system 102. The monitoring system 102 can generate one or more notifications and can provide the notification to the consumer 110. In some embodiments, the identity theft management system 122 can provide notifications to the consumer 110.

If the consumer 110 disagrees with the notification, the consumer 110 can generate and transmit a disagreement notification. In some embodiments, the consumer 110 can transmit disagreement notifications to the monitoring system 102. The consumer 110 can also transmit disagreement notifications to the identity theft management system 122.

The monitoring system 102 or the identity theft management system 122 can forward one or more identity theft notices. As shown in FIG. 15, identity theft notices can be transmitted to the one or more information networks 720, the identity verification system 710, the new account verification system 900, the new account identity theft detection system 910, and the vendor 112. The above systems can use the identity theft notices to perform further identity theft detection and prevention. The vendor 112 can use the identity theft notice to deny the new account opening request and to initiate one or more investigative process.

In some embodiments, if the consumer 110 becomes the victim of identity theft, the identity theft management system 122 can provide identity theft investigative and resolution services. For example, the identity theft management system 122 can link identity theft victims with law enforcement and other identity theft recovery services that can be used to investigate identity theft activities. In some embodiments, the identity theft investigation services can assign a recovery manager that can help manage the case and activate a recovery team. A recovery team can include fraud investigators, legal counsel, and other identity theft experts. In some embodiments, the identity theft management system 122 provides identity theft insurance and can provide reimbursement for lost time and money during the investigation and resolution of an identity theft case.

After recovering a stolen identity (or before an identity is stolen), the identity theft management system 122 can provide identity theft protection training and risk assessment that the consumer 110 can use to determine how likely they are to become an identity theft victim and what actions they can take to reduce their likelihood. In some embodiments, the identity theft management system 122 provides protection plans that the consumer 110 can follow to keep their identity from being stolen. The protection plans can be customized to a particular consumer.

As shown in FIG. 15, the identity theft solution system 100 can receive account address updates from the vendor 112 on behalf of the consumer 110. The identity theft solution system 100 can also receive account address updates from the consumer 110. As described above with respect to FIGS. 13 and 14, the identity verification system 710 and/or the addresses analyzer 700 can screen the account address update. The identity verification system 710 and/or the address analyzer 700 can provide a response to the vendor 112 or the consumer 110.

In some embodiments, one or more events 190 can be generated while screening the account address update. The events can be received by the monitoring system 102, and the monitoring system 102 can generate one or more notifications based on the events. The notifications can be provided to the consumer 110, and the consumer 110 can returned a disagreement notification to the monitoring system 102 and/or the identity theft management system 122. Upon receiving a disagreement notification, identity theft notices can be transmitted to systems within the identity theft solution system 100 and external to the identity theft solution system 100. A system receiving an identity theft notice can use the notice to deny an account address update. A system receiving an identity theft notice can also use the notice to place a freeze on a consumer's account information. In some embodiments, a system receiving an identity theft notice can also initiate one or more investigative process to identity an origination of the account address update.

The identity theft solution system 100 can include additional systems and functionality. For example, the identity theft solution system 100 can include one or more credit monitoring systems, such as TrueCredits$^{SM}$ provided by TransUnion™. The functionality provided by the systems illustrated and described above with respect to FIG. 15 can also be combined and distributed in various configurations.

Various features of the invention are set forth in the following claims.

The invention claimed is:

1. A method of monitoring financial information of a consumer and reporting account activity using a system including a central computer in communication with a computer network, the method comprising:
    generating, by the central computer, a unique key for the consumer based on information associated with the consumer;
    storing, by the central computer, in a first database containing a plurality of keys for other consumers, the unique key for the consumer;
    storing, by the central computer, in the first database, a consumer preference of the consumer for notification of an event type, wherein the first database contains consumer preferences for a plurality of customers for notification of event types;
    receiving, by the central computer, an account event from an event provider computer, the account event comprising consumer information for the account event and the account event having an event type;
    generating, by the central computer, a key for the account event based on information associated with the consumer;
    scoring, by the central computer, the account event;
    sending, by the central computer, a notice of the scored account event to the event provider computer;
    determining, by the central computer, that the account event is associated with the consumer by (i) comparing the generated key for the account event with the stored unique key generated for the consumer and (ii) determining, based on the comparison, that they match;
    based on the determined match, determining, by the central computer, that the event type of the consumer preference stored at the first database matches the event type of the account event;

identifying, by the central computer, keys from the first database that match the unique key generated for the consumer;
generating, by the central computer and based on the determined consumer preference, a notification including an event listing of account events that (i) have the identified keys that match the unique key generated for the consumer and (ii) correspond to the determined consumer preference, wherein the event listing includes the account event;
encrypting, by the central computer, the notification;
receiving, by the central computer, from a second database, an output file format for a vendor;
generating, by the central computer, an output file according to the output file format, wherein
the output file comprises a plurality of segments, wherein at least one of the segments contains the encrypted notification;
sending, by the central computer, the output file to a computer of the vendor; and
providing, by the central computer, the notification to a computer of the consumer based on the consumer preference of the consumer.

2. The method of claim 1 wherein the event listing includes at least one of an event date, an event source, and an indication of additional matching events.

3. The method of claim 1 wherein the notification includes an instruction section that specifies how to generate a disagreement notification.

4. The method of claim 1 wherein the information associated with the consumer includes debit information.

5. The method of claim 1 wherein providing the notification to the computer of the consumer includes electronically mailing the notification to the consumer via the computer network.

6. The method of claim 1 further comprising receiving a disagreement notification from the consumer if the consumer disagrees with the notification.

7. The method of claim 6 further comprising transmitting an identity theft notice via the computer network upon receiving the disagreement notification.

8. The method of claim 1 wherein the event provider computer is part of a financial institution.

9. The method of claim 1 wherein the account event comprises at least one of an account closure event, a new account inquiry event, a returned check event, a payment device order event, and a lost or stolen account information event.

10. The method of claim 1, further comprising receiving, by the central computer, an account event from an event provider computer via the computer network, wherein the another account event comprises an account freeze information event.

11. The method of claim 1 further comprising receiving updated information from the consumer and storing the updated information on the central computer.

12. The method of claim 1 further comprising storing the account event on the central computer.

13. A system for monitoring financial information of a plurality of consumers and reporting account activity, the system comprising:
a network adapter providing a connection to a consumer database configured to store information obtained from the plurality of consumers and a connection to an event provider computer configured to transmit an account event via the computer network;
a processor; and
a non-transitory computer-readable medium containing a set of instructions that, when executed by the processor, cause the processor to perform operations comprising:
generating a unique key for a consumer based on information associated with the consumer;
storing, by the central computer, in a consumer database containing a plurality of keys for other consumers, the unique key for the consumer;
storing, by the central computer, in the consumer database, a consumer preference of the consumer for notification of an event type, wherein the consumer database contains consumer preferences for a plurality of consumers for notification of event types;
receiving, by the event provider computer, an account event, the account event comprising consumer information for the account event and the account event having an event type;
generating a key for the account event based on information associated with the consumer;
scoring, by the central computer, the account event;
sending, by the central computer, a notice of the scored account event to the event provider computer;
determining, by the central computer, that the account event is associated with the consumer by (i) comparing the generated key for the account event with the stored unique key generated for the consumer and (ii) determining, based on the comparison, they match;
based on the determined match, determining that the event type of the consumer preference stored at the consumer database matches the event type of the account event;
identifying, by the central computer, keys from the first database that match the unique key generated for the consumer;
generating, based on the determined consumer preference, a notification including an event listing of account events that (i) have the identified keys that match the unique key generated for the consumer and (ii) correspond to the determined consumer preference, wherein the event listing includes the account event;
encrypting the notification;
receiving, by the central computer, from a second database, an output file format for a vendor;
generating an output file according to the output file format, wherein
the output file comprises a plurality of segments, wherein at least one of the segments contains the encrypted notification;
sending the output file to a computer of the vendor; and
providing, by the central computer, the notification to a computer of the consumer based on the consumer preference of the consumer.

14. The system of claim 13 wherein the information stored in the consumer database includes debit information.

15. The system of claim 13 wherein the non-transitory computer-readable medium contains instructions to electronically mail the notification to one of the plurality of consumers via the computer network.

16. The system of claim 13 wherein the non-transitory computer-readable medium contains instructions to receive a disagreement notification from the at least one consumer of the plurality of consumers.

17. The system of claim 16 wherein the non-transitory computer-readable medium contains instructions to transmit an identity theft notice via the computer network upon receiving the disagreement notification.

18. The system of claim 13 wherein the event provider computer is part of a financial institution.

19. The system of claim 13 wherein the account event comprises at least one of an account closure event, a new account inquiry event, a returned check event, a payment device order event, and a lost or stolen account information event.

20. The system of claim 13 the operations comprising receiving, via the connection to the event provider computer, another account event, wherein the another account event comprises an account freeze information event.

21. The system of claim 13 wherein the non-transitory computer-readable medium contains instructions to receive updated information via the computer network and to store the updated information in the consumer database on the central computer.

22. The system of claim 13 wherein the non-transitory computer-readable medium contains instructions to store the account event on the central computer.

23. The method of claim 9 further comprising receiving a new account inquiry event via the computer network.

24. The method of claim 9 further comprising receiving a returned check event via the computer network.

25. The method of claim 9 further comprising receiving a payment device order event via the computer network.

26. The method of claim 9 further comprising receiving a lost or stolen account information event via the computer network.

27. The system of claim 19 wherein the system is further configured to receive a new account inquiry event via the computer network.

28. The system of claim 19 wherein the system is further configured to receive a returned check event via the computer network.

29. The system of claim 19 wherein the system is further configured to receive a payment device order event via the computer network.

30. The system of claim 19 wherein the system is further configured to receive a lost or stolen account information event via the computer network.

31. A financial information monitoring system, the system comprising:
a network adapter providing a connection to a consumer database configured to store information obtained from the plurality of consumers, a connection to an event provider computer configured to transmit an account event via the computer network, and a connection to an identity theft solution server;
a processor; and
a non-transitory computer-readable medium containing a set of instructions that, when executed by the processor, cause the processor to perform operations comprising:
generating a unique key for a consumer based on information associated with the consumer;
storing, by the central computer, in the consumer database, a plurality of keys for other consumers and the unique key for the consumer;
storing, by the central computer, in the consumer database, a consumer preference of the consumer for notification of an event type, wherein the consumer database contains consumer preferences for a plurality of customers for notification of event types;
receiving, from the event provider computer, an account event, the account event comprising consumer information for the account event and the account event having an event type;
generating a key for the account event based on information associated with the consumer;
scoring, by the central computer, the account event;
sending, by the central computer, the scored account event to the identity theft solution server;
determining, by the central computer, that the account event is associated with the consumer by (i) comparing the generated key for the account event with the unique key generated for the consumer and (ii) determining, based on the comparison, that they match;
based on the determined match, determining, via the connection to the event provider computer, that the event type of the consumer preference stored at the first database matches the event type of the account event;
identifying, by the central computer, keys from the first database that match the unique key generated for the consumer;
generating, based on the determined consumer preference, a notification including an event listing of account events that (i) have the identified keys that match the unique key generated for the consumer and (ii) correspond to the determined consumer preference, wherein the event listing includes the account event;
encrypting the notification;
receiving, by the central computer, from a second database, an output file format for a vendor;
generating an output file according to the output file format, wherein
the output file comprises a plurality of segments, wherein at least one of the segments contains the encrypted notification;
sending, by the central computer, the output file to a computer of the vendor; and
providing, by the central computer, the notification to a computer of the consumer based on the consumer preference of the consumer.

32. The method of claim 1 further comprising determining the account event is valid by determining the account event is from an authorized source.

33. The method of claim 1 further comprising determining the account event is valid by determining the event provider computer is authorized.

34. The method of claim 1 further comprising determining the account event is valid by determining the event is in a format or structure of the system.

35. The system of claim 13 further comprising determining when the account closure event is valid by determining the account event is from an authorized source.

36. The system of claim 13 further comprising determining the account event is valid by determining the event provider computer is authorized.

37. The system of claim 13 further comprising determining the account event is valid comprises determining the account event is in a format or structure of the system.

38. The system of claim 31 further comprising determining the account event is valid by determining the account event is from an authorized source.

39. The system of claim 31 further comprising determining the account event is valid by determining the event provider computer is authorized.

40. The system of claim 31 further comprising determining the account event is valid by determining the event is in a format or structure of the system.

41. A non-transitory computer-readable medium storing a set of instructions that, when executed by a processor, cause the processor to perform operations of monitoring financial information of a consumer and reporting account activity using a system including a central computer in communication with a computer network, the operations comprising:

generating, by the central computer, a unique key for a consumer based on information associated with the consumer;

storing, by the central computer, in a first database containing a plurality of keys for other consumers, the unique key for the consumer;

storing, by the central computer, in the first database, a consumer preference of the consumer for notification of an event type, wherein the first database contains consumer preferences for a plurality of customers for notification of event types;

receiving, by the central computer, an account event from an event provider computer, the account event comprising consumer information for the account event and the account event having an event type;

generating, by the central computer, a key for the account event based on information associated with the consumer;

scoring, by the central computer, the account event;

sending, by the central computer, a notice of the scored account event to the event provider computer;

determining, by the central computer, that account event is associated with the consumer by (i) comparing the generated key for the account event with the unique key generated for the consumer and (ii) determining, based on the comparison, that they match;

based on the determined match, determining, by the central computer, that the event type of the consumer preference stored at the first database matches the event type of the account event;

generating, by the central computer and based on the determined consumer preference, a notification including an event listing of account events that (i) have the identified keys that match the unique key generated for the consumer and (ii) correspond to the determined consumer preference, wherein the event listing includes the account event;

encrypting, by the central computer, the notification;

receiving, by the central computer, from a second database, an output file format for a vendor;

generating, by the central computer, an output file according to the output file format, wherein the output file comprises a plurality of segments, wherein at least one of the segments contains the encrypted notification;

sending, by the central computer, the output file to a computer of the vendor; and providing, by the central computer, the notification to a computer of the consumer based on the consumer preference of the consumer.

42. The computer-readable medium of claim 41 wherein the event listing includes at least one of an event date, an event source, and an indication of additional matching events.

43. The computer-readable medium of claim 41 wherein the notification includes an instruction section that specifies how to generate a disagreement notification.

44. The computer-readable medium of claim 41 wherein the information associated with the consumer includes debit information.

45. The computer-readable medium of claim 41 wherein providing the notification to the computer of the consumer includes electronically mailing the notification to the consumer via the computer network.

46. The computer-readable medium of claim 41, the method further comprising receiving a disagreement notification from the consumer if the consumer disagrees with the notification.

47. The computer-readable medium of claim 46, the method further comprising transmitting an identity theft notice via the computer network upon receiving the disagreement notification.

48. The computer-readable medium of claim 41 wherein the event provider computer is part of a financial institution.

49. The computer-readable medium of claim 41 wherein the account event comprises at least one of an account closure event, a new account inquiry event, a returned check event, a payment device order event, and a lost or stolen account information event.

50. The computer-readable medium of claim 41, the operations comprise receiving, by the central computer, another account event from the event provider computer via the computer network, wherein the another account event comprises an account freeze information event.

51. The system of claim 31 wherein the account event comprises at least one of an account closure event, a new account inquiry event, a returned check event, a payment device order event, and a lost or stolen account information event.

52. The system of claim 31, the operations comprising receiving, by the central computer, another account event from an event provider computer via the computer network, wherein the another account event comprises an account freeze information event.

* * * * *